(12) United States Patent
Tarui et al.

(10) Patent No.: US 8,095,701 B2
(45) Date of Patent: Jan. 10, 2012

(54) COMPUTER SYSTEM AND I/O BRIDGE

(75) Inventors: Toshiaki Tarui, Sagamihara (JP); Yoshiko Yasuda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 968 days.

(21) Appl. No.: 11/490,141

(22) Filed: Jul. 21, 2006

(65) Prior Publication Data

US 2007/0067432 A1 Mar. 22, 2007

(30) Foreign Application Priority Data

Sep. 21, 2005 (JP) ................................. 2005-273400

(51) Int. Cl.
 *G06F 13/10* (2006.01)
(52) U.S. Cl. .......................................... 710/33; 710/22
(58) Field of Classification Search .................. 370/230, 370/241, 242, 351, 260, 389; 710/106, 312, 710/316; 711/100, 111, 114, 162; 714/5, 714/6, 7, 8
See application file for complete search history.

(56) References Cited

U.S. PATENT DOCUMENTS

| | | | |
|---|---|---|---|
| 6,665,759 B2 | 12/2003 | Dawkins et al. | |
| 6,701,464 B2 * | 3/2004 | Austen et al. | 714/48 |
| 6,996,658 B2 * | 2/2006 | Brocco et al. | 710/312 |
| 7,219,183 B2 * | 5/2007 | Pettey et al. | 710/316 |
| 7,260,661 B2 * | 8/2007 | Bury et al. | 710/106 |
| 7,343,434 B2 * | 3/2008 | Kapoor et al. | 710/56 |
| 7,398,337 B2 * | 7/2008 | Arndt et al. | 710/37 |
| 7,454,552 B2 * | 11/2008 | Stewart et al. | 710/315 |
| 7,464,174 B1 * | 12/2008 | Ngai | 709/234 |
| 7,522,520 B2 * | 4/2009 | Griggs | 370/230 |
| 7,525,957 B2 * | 4/2009 | Scherer et al. | 370/360 |
| 7,526,570 B2 * | 4/2009 | Rooholamini et al. | 709/241 |
| 7,555,002 B2 * | 6/2009 | Arndt et al. | 370/429 |
| 7,899,030 B2 * | 3/2011 | Mayhew et al. | 370/351 |
| 2002/0112102 A1 | 8/2002 | Tarui et al. | |

(Continued)

FOREIGN PATENT DOCUMENTS

JP 2002-304364 10/2002

OTHER PUBLICATIONS

Advanced Switching Overview.

(Continued)

*Primary Examiner* — Cheng-Yuan Tseng
(74) *Attorney, Agent, or Firm* — Brundidge & Stanger, P.C.

(57) ABSTRACT

A computer system reduces an overhead by using an I/O switch high in versatility when realizing the sharing of an I/O between virtual computers. The system includes a CPU module #0 having plural CPU cores, an AS bridge 15 connected to the CPU cores, and a main memory that can be accessed from the CPU cores or the AS bridge 15, and AS switches SW0 and SW1 that connect the AS bridge 15 of the CPU module #0 and an I/O blade #5. The CPU module #0 has a hypervisor that divides the plural CPU cores and the main memory into plural logical partitions, and the AS bridge 15 adds virtual path information set in each of the logical partitions and path information of from the AS bridge 15 to the I/O blade #5 to the path information of the AS packet to switch over the AS packet between each of the logical partitions and the I/O blade #5 when relaying the AS packet transmitted or received between the logical partitions and the I/O blade #5.

19 Claims, 13 Drawing Sheets

U.S. PATENT DOCUMENTS

| | | | |
|---|---|---|---|
| 2004/0128410 A1* | 7/2004 | Mayhew et al. | 710/30 |
| 2005/0018669 A1* | 1/2005 | Arndt et al. | 370/389 |
| 2006/0050693 A1* | 3/2006 | Bury et al. | 370/389 |
| 2006/0206655 A1* | 9/2006 | Chappell et al. | 710/315 |
| 2006/0212870 A1* | 9/2006 | Arndt et al. | 718/104 |
| 2006/0236017 A1* | 10/2006 | Rooholamini et al. | 710/316 |
| 2007/0297406 A1* | 12/2007 | Rooholamini | 370/390 |

OTHER PUBLICATIONS

"Advanced switching technical summary," online retrieval on Aug. 16, 2006, internet http:www.asi-sig.org/education/ASL_ADVSwitch_TB_JP.pdf (with translation of relevant portion).

* cited by examiner

FIG. 8

| VIRTUAL SW PORT NO. | PARTITION NO. | VALID/INVALID |
|---|---|---|
| 1 | 1 | VALID |
| 2 | 0 | VALID |

FIG. 9

| PARTITION NO. | BASE ADDRESS | SIZE |
|---|---|---|
| 0 | Base0 | Size0 |
| 1 | Base1 | Size1 |

TARGET LPAR NUMBER REGISTER
158

CPU BLADE INITIALIZING OPERATION

FIG. 17
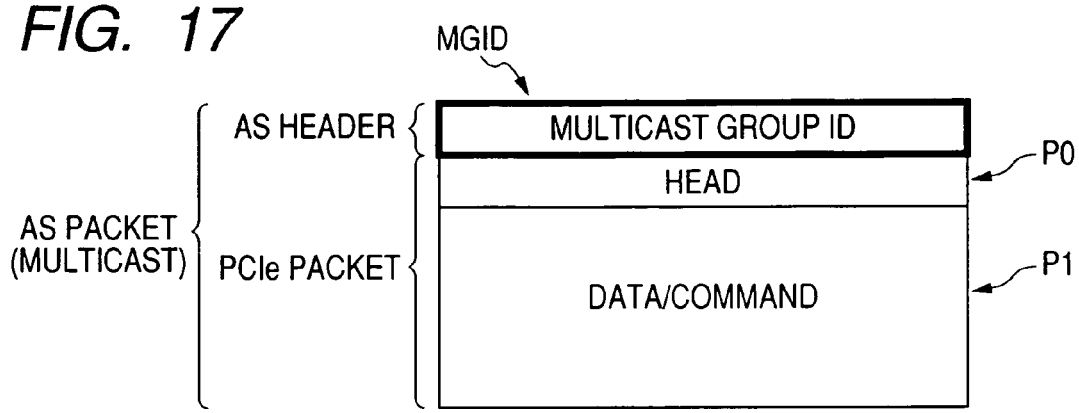
FIG. 18
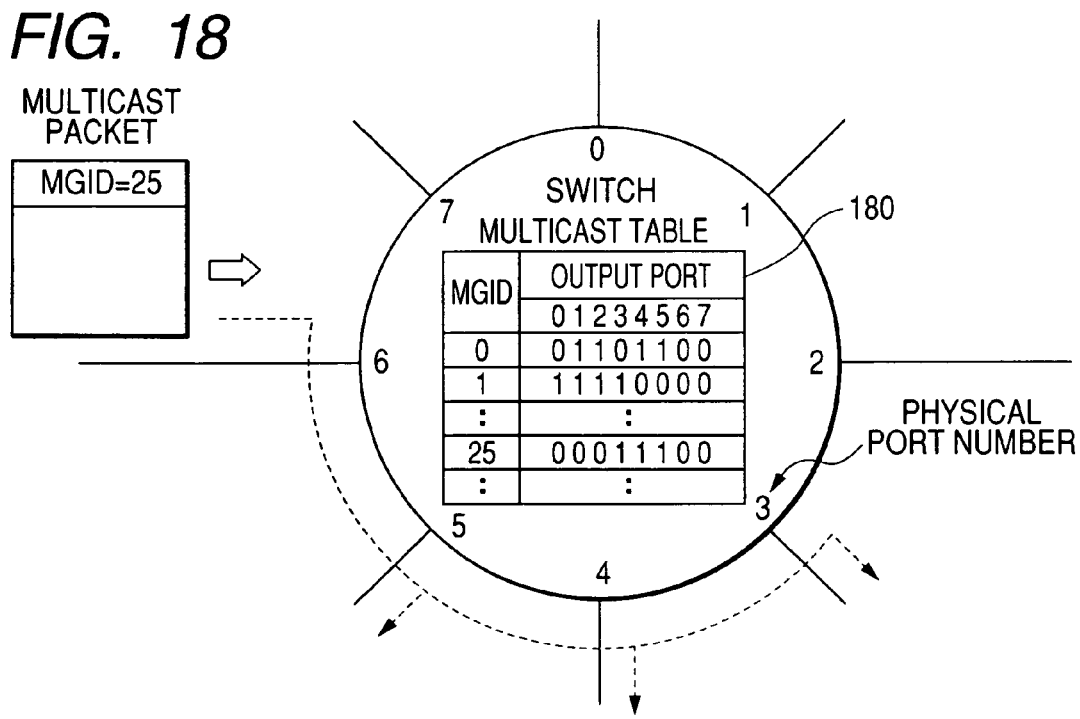
FIG. 19

COMPUTER SYSTEM AND I/O BRIDGE

CLAIM OF PRIORITY

The present application claims priority from Japanese application JP 2005-273400 filed on Sep. 21, 2005, the content of which is hereby incorporated by reference into this application.

FIELD OF THE INVENTION

The present invention relates to a virtual computer system, and more particularly to a technique by which the allocation of plural logical partitions and an I/O device are realized by an I/O switch.

BACKGROUND OF THE INVENTION

In recent years, an increase in the number of servers makes the complexity associated with the operation increase, as a result of which there arises a problem of an increase in the operation costs. As a technique that reduces the operation costs, attention is focused on a server consolidation that consolidates plural servers into one.

As one of techniques that realize the server consolidations, there has been known a virtual machine that logically divides one computing machine at an arbitrary rate. In the technique, a firmware (or middleware) such as a hypervisor allows a physical computing machine to be divided into plural logical partitions (LPAR), a computing machine resource (CPU, main memory, I/O) is allocated to each of the LPARs, and an OS is operated on each of the LPARs (for example, JP 2002-304364A).

Also, there has been known a technique by which plural guest OSs are operated on a host OS, and the respective guest OSs are provided as the logical partitions as in VMware (registered trademark).

Further, in recent years, there has been known a technique by which the construction of an I/O sub-system is more flexibly re-configured by a blade server that is capable of changing the configuration of computing machine on a baseboard basis. Furthermore, a server consolidation that consolidates a large number of servers into a blade server is conducted.

Also, in recent years, there has been proposed an I/O switch that is represented by an AS (advanced switching) (for example, "Advanced switching technical summary"). The I/O switch of this type realizes a shared I/O card (or I/O device) from plural CPUs (physical CPUs). The AS is high in the versatility because there can be used the I/O device (or I/O card) of the PCI-EXPRESS standards which is presently spreading.

In the shared I/O between the respective logical partitions due to the VMware, because the logical partitions cannot be identified on the I/O device side, it is necessary that the I/O requests of the respective logical partitions are centrally-managed and given to the physical I/O device. For that reason, when the host OS centrally controls the I/O operation, thereby realizing the shared I/O device between the respective logical partitions which are constructed by the guest OSs. As a result, the I/O requests from the respective logical partitions are conducted on the physical I/O device after waiting for the processing of the host OS once. Therefore, there arises such a problem that the processing of the host OS becomes overhead, and a response of the I/O is lowered.

In the above hypervisor, a specific I/O device (a channel) which is capable of being aware of the logical partitions is used to share the I/O between virtual machines. The I/O device conducts the I/O operation while being aware of the partitions, and is capable of directly accessing to the I/O device from the respective logical partitions. However, because the special I/O device is required, there arise such problems that the manufacturing costs are high, and the versatility is low.

On the other hand, in the case where the I/O switch such as the advanced switching is used in the above conventional hypervisor to share the I/O device between the logical partitions, there occurs the following problems.

Because the above advanced switching (hereinafter referred to simply as "AS") is capable of identifying nothing other than a physical node (or device), the AS is incapable of identifying the logical partitions that are provided by the hypervisor, and the AS as it is cannot be applied to the above hypervisor. For that reason, software that centrally controls the I/O operation of the AS is required as in the above VMware, which leads such a problem that the processing of the software operation itself becomes the overhead of the I/O access.

SUMMARY OF THE INVENTION

Under the circumstances, the present invention has been made in view of the above problem, and therefore an object of the present invention is to reduce the overhead by using an I/O switch high in the versatility which is represented by an AS when the shared I/O is realized between the respective logical partitions of a virtual computing machine.

In order to address the above object, according to an embodiment of the present invention, a computer system, includes: a CPU module including a plurality of CPU cores, an I/O bridge that is connected to the CPU cores, and a main memory that can be accessed from the CPU cores or the I/O bridge; and an I/O switch that connects the I/O bridge of the CPU module to an I/O module, wherein the CPU module includes a firmware that divides the plurality of CPU cores and the main memory into a plurality of logical partitions, wherein the I/O bridge includes a virtual switch that constructs path information of the I/O access information from virtual path information that is set according to each of the logical partitions and path information from the I/O bridge to the I/O module, and alters the I/O access information to access the I/O module according to each of the logical partitions, when relaying the I/O access information that is transmitted or received between the logical partitions and the I/O module.

Therefore, according to an embodiment of the present invention, when the I/O module is shared between the plural logical partitions by the I/O switch in a virtual computer system, utilizing the I/O bridge of the CPU module that has function as a virtual switch, and sets virtual path information according to each of the logical partitions, the shared I/O in computer system which has plural logical partition can be realized by using the I/O switch.

Further, when the I/O is shared between the logical partitions at the hardware level of the I/O bridge, a software for identifying the logical partitions becomes unnecessary, thereby making it possible to reduce the overhead of the I/O access for the purpose of conducting high speed operation.

BRIEF DESCRIPTION OF THE DRAWINGS

These and other objects and advantages of this invention will become more fully apparent from the following detailed description taken with the accompanying drawings in which:

FIG. 8 is an explanatory diagram showing an example of a partition management table;

FIG. 9 is an explanatory diagram showing an example of an address management table;

FIG. 17 is an explanatory diagram showing an example of a multicast packet;

FIG. 18 is an explanatory diagram showing an example of a switch that conducts multicast; and FIG. 19 is an explanatory diagram showing an example of a virtual switch multicast table.

DETAILED DESCRIPTION OF THE PREFERRED EMBODIMENTS

Now, a description will be given of embodiments of the present invention with reference to the accompanying drawings.

Figure 1:
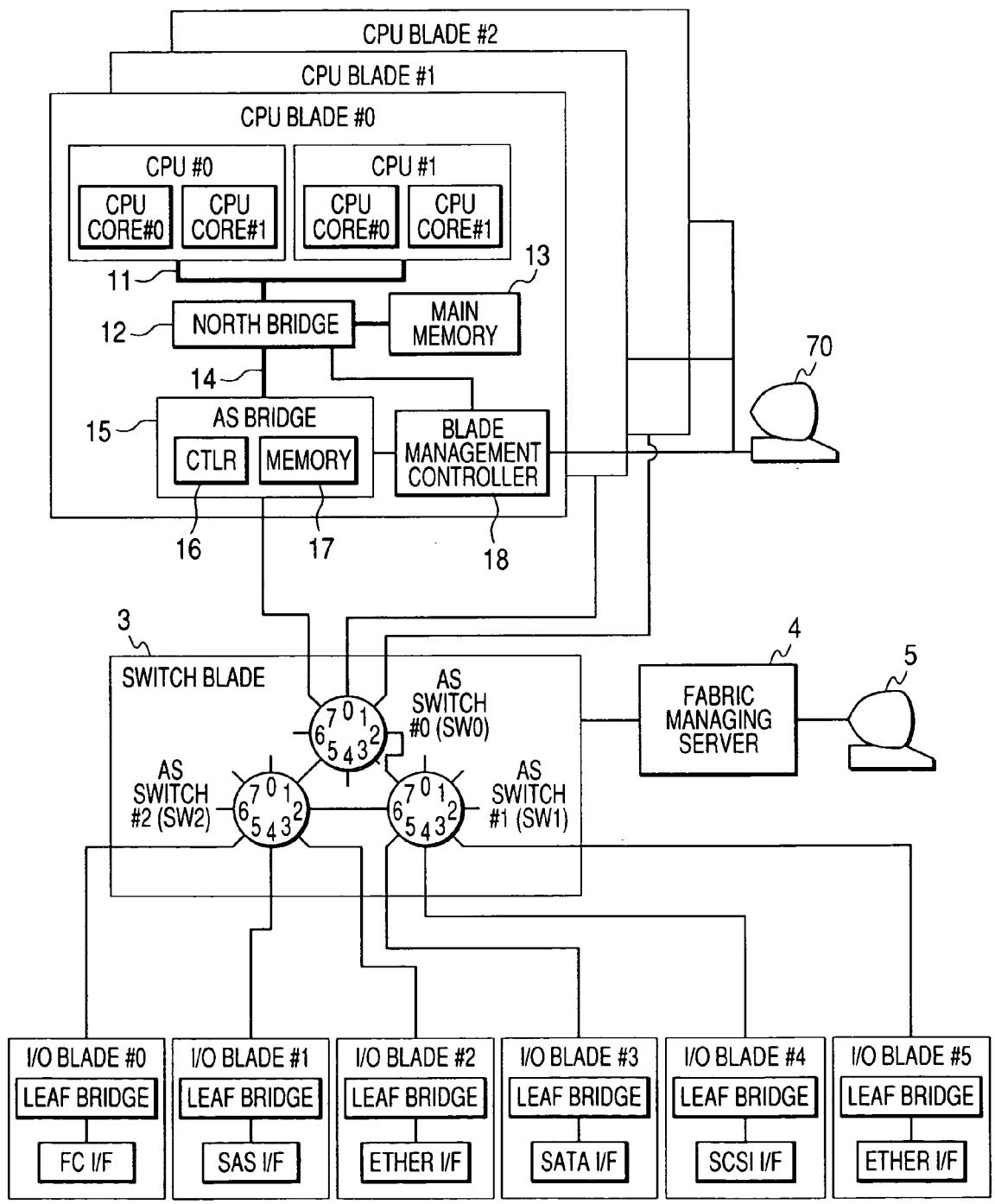
FIG. 1 is a block diagram showing a computer system according to an embodiment of the present invention.

FIG. 1 is a block diagram showing a blade server system (physical computer) according to a first embodiment of the present invention.

A blade server system includes plural CPU blades #0 to #2, plural I/O blades (or I/O cards) having various I/O interfaces, and a switch blade 3 having plural I/O switches #0 to #2 that connect the CPU blades #0 to #2 to the I/O blades #0 to #5. The CPU blades #0 to #2, the I/O blades #0 to #5, and the switch blade 3 are housed in a package not shown. The switch blade 3 is connected with a fabric managing server 4 that manages the allocation of the I/O blades #0 to #5 to the I/O switches #0 to #2 and the CPU blades #0 to #2. The fabric managing server 4 is connected with a console 5 that enables an input or an output with respect to a manager. The CPU blades (CPU modules) #0 to #2, the I/O blades (I/O modules) #0 to #5, and the switch blade (switch module) 3 are connected to each other through a backplane not shown.

In the blade server system according to this embodiment, a virtual computer in which a computer resource of the CPU blades #0 to #2 is divided into plural logical partitions operates as will be described later.

Hereinafter, a description will be given of the outlines of the respective blades of the blade server.

<CPU Blade>

Each of the CPU blades #0 to #2 includes plural CPUs each having plural CPU cores #0 and #1 (that is, multicore CPUs). Since the CPU blades #0 to #2 are identical in the structure with each other, only the structure of the CPU blade #0 will be described below.

The CPU #0 includes plural CPU cores #0-0 and #0-1, and the CPU#1 includes plural CPU cores #1-0 and #1-1. The CPUs #0 and #1 are connected to a north bridge 12 through a front side bus 11.

The north bridge 12 is connected to a main memory 13 through a memory bus, and accesses to the main memory 13 in response to a memory access request of the CPUs #0 and #1. Also, the north bridge 12 is connected to an AS (advanced switching) bridge 15 as the I/O bridge through an I/O bus 14, and accesses to the AS bridge 15 in response to an I/O access request of the CPU #0 and #1. In this example, the I/O bus 14 is structured by a PCI-EXPRESS.

The AS bridge 15 is structured in conformity with the AS (advanced switching) standards, and adds path information to a packet (I/O access information) of the PCI-EXPRESS (hereinafter referred to as "PCIe") from the I/O bus 14 into an AS packet, and transmits the AS packet to the switches #0 (SW0) to #2 (SW2) that will be described later. Also, the AS bridge 15 converts the packet that has been received from the switches #0 (SW0) to #2 (SW2) that will be described later into a packet of PCIe, identifies the logical partitions that are allocated to the CPU core #0-0 to the CPU core #1-1, and distributes the packets. For that reason, the AS bridge 15 includes a controller 16 and a memory 17, and is connected to the switch blade 3.

Also, the AS bridge 15 functions as a virtual switch that allocates a packet from the AS (switch blade 3) side to the logical partitions as will be described later.

Further, the north bridge 12 and the AS bridge 15 is connected to a BMC (baseboard management controller or blade management controller) 18 that manages hardware on the CPU blade #0, and manages the hardware that is connected to the respective bridges. The BMC 7 monitors a voltage, a temperature, and an error of the hardware on the baseboard, and notifies the OS or hypervisor of the monitored results. The BMC 7 is disposed in each of the CPU blades, and each of the BMCs 7 is connected to each other on the network, and has a console 70 that manages the respective BMCs 7.

In this embodiment, the console 70 and the fabric managing server 4 are separated from each other, but may be implemented as the same server.

<Switch Blade>

The switch blade 3 has plural AS switches (I/O switches) #0 (SW0), #1 (SW1), and #2 (SW2). The AS switch #0 is connected to the CPU blades #0 to #2, the AS switches #1 and #2 are connected to the I/O blades #0 to #5, and the AS switches #0 to #2 are connected to each other. Also, the AS switches #0 to #2 are connected to each other.

Each of the AS switches #0 to #2 has plural ports, and, for example, made up of 8 ports. The AS switch #0 has a port 7 connected to the AS bridge 15 of the CPU blade #0, a port 0 connected to an AS bridge (not shown) of the CPU blade #1, and a port 1 connected to an AS bridge (not shown) of the CPU blade #2. The AS switch #0 also has a port 2 connected to a port 7 of the AS switch #1, and a port 5 connected to a port 1 of the AS switch #2.

The AS switch #1 has ports 3 to 5 connected to the I/O blades #3 to #5, a port 7 connected to a port 2 of the AS switch #0, and a port 6 connected to a port 2 of the AS switch #2.

The AS switch #2 has ports 3 to 5 connected to the I/O blades #2 to #2, a port 1 connected to the port 5 of the AS switch #0, and a port 2 connected to a port 6 of the AS switch #1.

Now, the packet form and routing in the AS will be described. The conventional advanced switching packet (hereinafter referred to as "AS packet") that passes through the AS switches #0 to #2 is structured by adding an AS header to a PCIe packet made up of a header portion P0 and a data portion P1 as shown in FIGS. 5 and 6.

The AS packet has two types of a unicast packet that is transmitted to a single destination and a multicast packet that is transmitted to plural destinations. The unicast and the multicast are distinguished by a protocol interface (representative of a command type) field (not shown) within the AS header. Hereinafter, the routing systems in the respective cases will be described.

(1) In the case of the unicast (no multicast) packet, the unicast packet has turn pool values TP1 to TPn indicative of the number of changeover in the respective switches and information such as bit DIR representative of the transfer direction (up/down) of the packet (header information other than the TP value and the DIR is omitted in the drawing). In the DIR, 0 is indicative of down whereas 1 is indicative of up. The turn pool values TP1 to TPn are added by an AS bridge 15 or I/O blades #0 to #5 according to the number of AS switches through which the AS packet passes.

Figure 5:
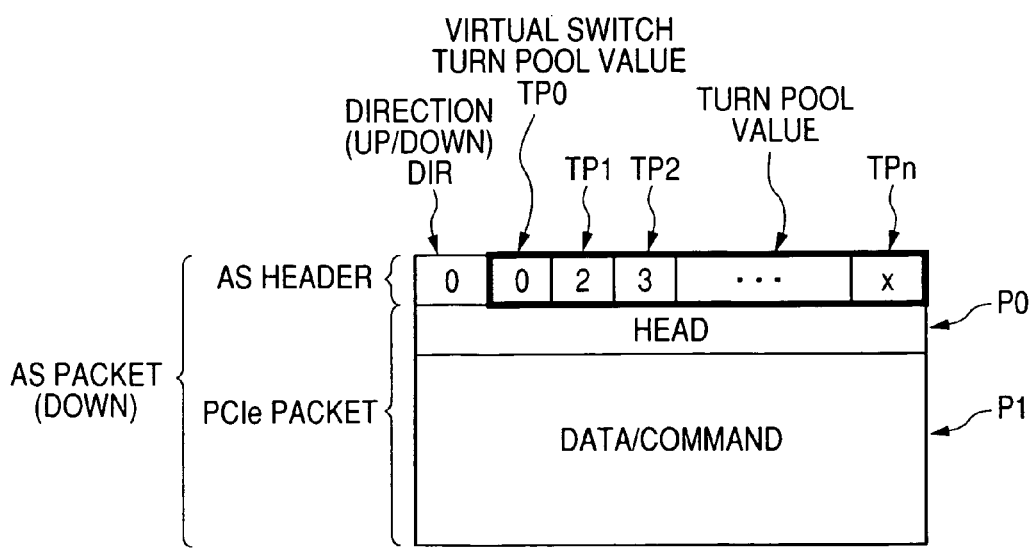
FIG. 5 is an explanatory diagram showing an example of a down AS packet.
Figure 6:
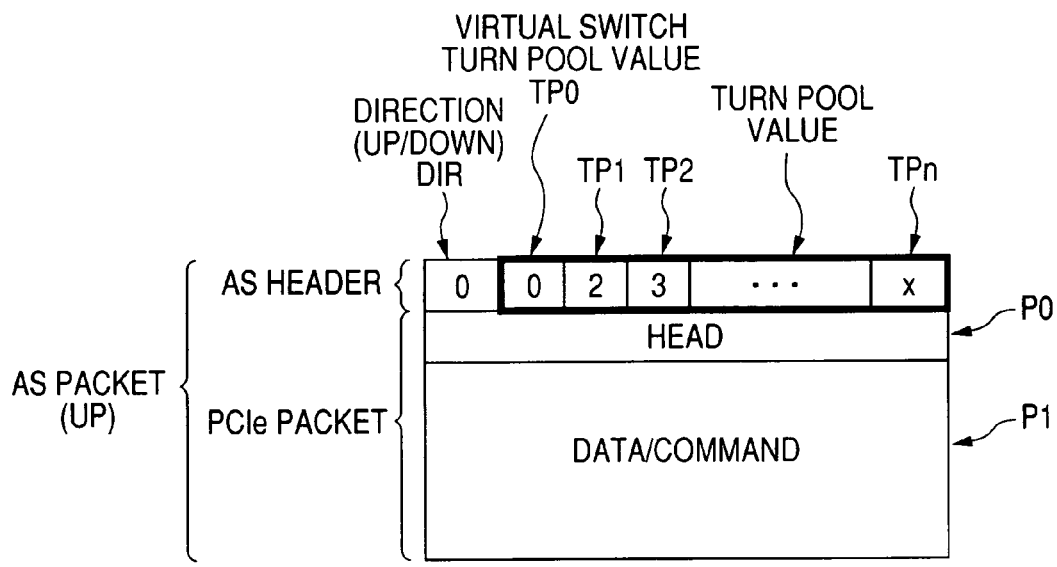
FIG. 6 is an explanatory diagram showing an example of an up AS packet.

Then, the AS bridge 15 according to an embodiment of the present invention sets a virtual switch turn pool value TP0 for identifying the logical partitions in addition to the turn pool values TP1 to TPn, as shown in FIGS. 5 and 6.

The AS switches #0 to #2 determine a forwarding designation on the basis of the down AS packet shown in FIG. 5 and the turn pool value of the up AS packet shown in FIG. 6. In this embodiment, a packet that is forwarded from the CPU blade to the I/O blade is a down AS packet whereas a packet that is forwarded from the I/O blade to the CPU blade is an up AS packet.

In the case of the down AS packet, the AS switches #0 to #2 determine a port that counts to the turn pool value from 0 clockwise from an adjacent port that receives the AS packet as a forwarding destination, and transfers the AS packet. In the case of the down packet (DIR=0), the turn pools are used from the left to the right (in the order of TP1 to TPn) every time the down packet passes through each of the AS switches.

Figure 4:
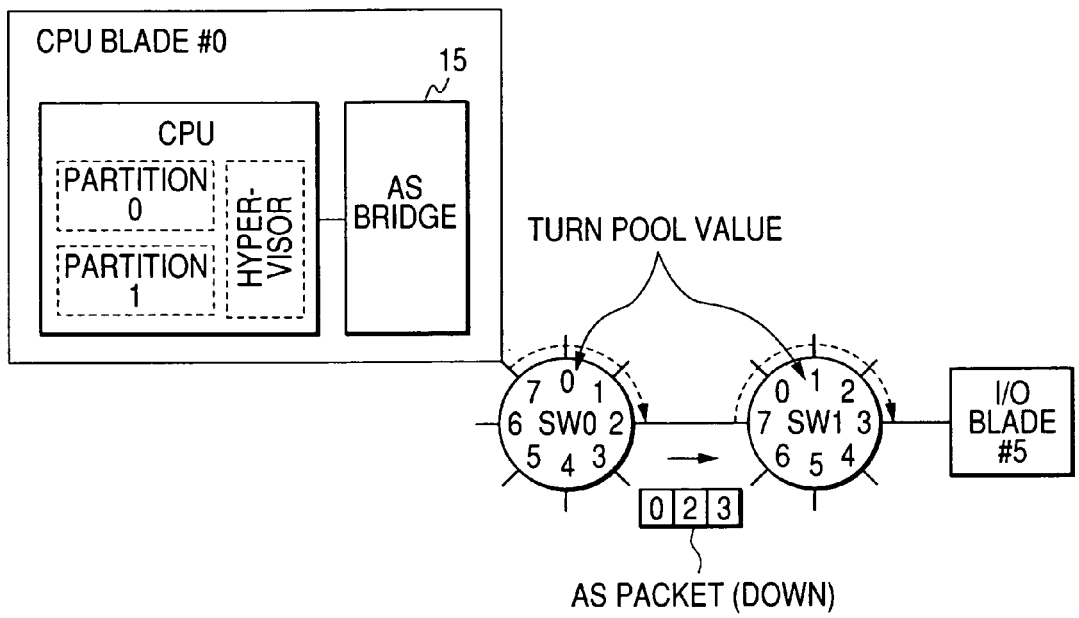
FIG. 4 is an explanatory diagram for explaining the function of the AS bridge.

For example, in FIG. 4, when the turn pool value of the down AS packet which has been received from the CPU blade #0 that is connected to the port 7 of the AS switch #0 is 2, the AS switch #0 counts the number of turn pool value from 0 in the order of 0-1-2 clockwise, and sets the port 2 as the forwarding designation of the AS packet.

On the contrary, in the case of the up packet (DIR=1), the value of the turn pool is counted counterclockwise, and the turn pool is used from the right to the left (in the order of TPn to TP1).

When the turn pool value of the up AS packet which has been received from the AS switch #1 that is connected to the port 2 of the AS switch #0 is 2, the AS switch #0 counts the number of turn pool value from 0 in the order of 1-0-7 counterclockwise, and sets the port 7 as the forwarding designation of the AS packet.

As a result, the turn pool values of a request (down) packet and a response (up) packet to the request packet can be made identical with each other, and the DIR bit is merely reversed (from 0 to 1), thereby making it possible to produce the routing information of the response packet. This makes it possible to readily produce the response packet in the bridge.

The details of the turn pool values TP0 to TPn will be described later.

The data portion P1 of the PCIe packet stores data and a command (I/O access command) therein.

(2) In the case of multicast packet

The AS is capable of conducting the multicast that sends the same data or event to plural designations. The designations of the multicast are managed by a unique number within a system which is called "an MGID (multicast group ID)". The packet having the same MGID is always multicast to the same destination. In order to realize this, which port of the respective AS switches data needs to be outputted to is set in the tables of respective AS switches for each of the multicast groups in advance. FIG. 17 shows the form of the multicast packet, and FIG. 18 shows the AS switch that conducts the multicast.

As shown in FIG. 17, in the multicast packet, the AS header of the packet has a multicast group ID (MGID) as the routing information (header information other than the MGID is omitted). In the AS switch, each of the MGIDs has a multicast table that indicates which port of the AS switch the packet should be sent to. FIG. 18 shows the structure of a multicast table 180 and the operation of an AS switch. In the multicast table 180, whether the packet should be outputted to the respective physical ports of the AS switch, or not, is represented by a bit map. For example, in FIG. 18, the packet whose MGID is 25 is outputted to the ports 3, 4, and 5 at which the corresponding entry of the multicast table 180 is 1.

In the present invention, the multicast table of a virtual switch that indicates which logical partition the packet is multicast to is provided in the bridge in addition to the respective AS switches, thereby making it possible to conduct the multicast toward the logical partition. The details of the multicast table of the virtual switch will be described later.

The multicast table 180 is disposed in each of the AS switches #0 to #2, and initialized by the fabric managing server 4 at the time of initializing the system or at the time of changing the structure.

The multicast from the I/O blade side is generated, for example, when data is received from a network interface (the I/O blades #0 and #5 having the Ether I/F in FIG. 1) or an interrupt from the I/O blade side is generated, in the case where the logical partition of the destination cannot be determined at the I/O blade side.

<I/O Blade>

The I/O blades #0 to #5 that are accessed from the CPU blades #0 to #2 through the AS switches #0 to #2 include various I/O interfaces, and a LEAF bridge for connecting the AS switches #0 to #2 to the respective I/O interfaces.

As shown in FIG. 4, each of the LEAF bridges of the I/O blades #0 to #5 stores the turn pool values TP0 to TPn of the down AS packet which is received by the I/O blade once, sets the turn pool values TP0 to TPn of the received AS packet in the up AS packet which is a reply to the down AS packet, and reverses the DIR bit as described above.

Furthermore, each of the LEAF bridges of the respective I/O blades #0 to #5 delivers the PCIe packet obtained by deleting the AS header from the AS packet to each of the I/O interfaces. Each of the I/O interfaces functions as the device of the PCIe. As shown in FIG. 1, each of the I/O interfaces is made up of an FC (fibre channel) interface, an SAS (serial attached SCSI) interface, an Ethernet (registered trademark) interface, an SATA (serial ATA) interface, or an SCSI interface.

<Fabric Managing Server>

The fabric managing server 4 that is connected to the switch blade 3 includes a CPU, a memory, and an interface (not shown). The fabric managing server 4 conducts the management of allocation of the I/O blades #0 to #5 which are used by the logical partitions which operate on the respective CPU blades #0 to #2, the management of the destination of the multicast, and setting of the AS switches #0 to #2 and the AS bridge.

The fabric managing server has two systems, that is, an In-bound management system that conducts management through the AS fabric, and an Out-of-bound management system that conducts management through a management network (Ethernet (registered trademark) (not shown) other than the AS fabric.

<Virtual Computer System>

Figure 2:
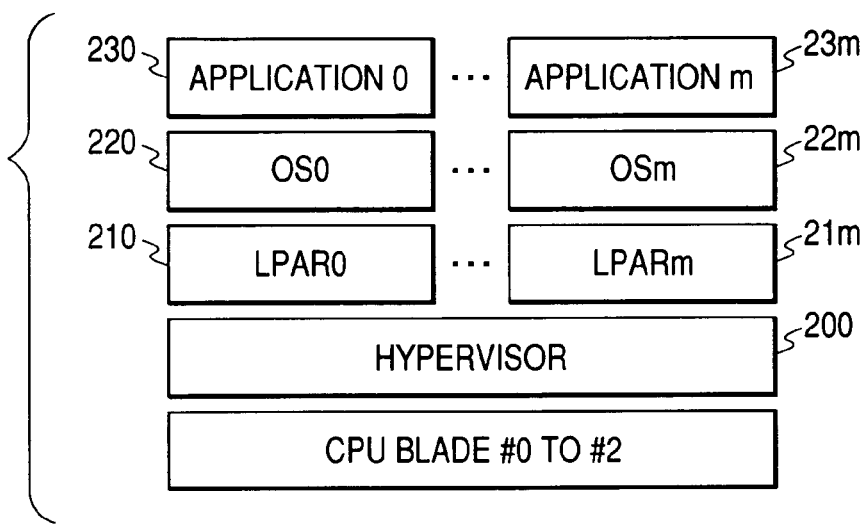
FIG. 2 is a functional block diagram showing the software of a virtual computer system according to an embodiment of the present invention.

Now, a description will be given in more detail of software that operates on the CPU blades #0 to #2 that constitute the physical computer with reference to FIG. 2.

The hypervisor 200 operates as firmware on the respective CPU blades #0 to #2, and the hypervisor 200 divides the physical computer 100 into two or more logical partitions (LPAR: logical PARtition) LPAR0 (210) to LPARm (21m), and manages the allocation of the computer resource.

The hypervisor 200 operates the OS0 (220) to OSm (22m) in the respective logical partitions LPAR0 to LPARm, and operates the respective application 0 (230) to application m (23m) on the respective OS.

The hypervisor allocates following resource (computer resource) to the respective logical partitions LPARs (210 to 21m); CPU core of CPU blades #0 to #2, the main memory 13, I/O blades #0 to #5 which are allocated to the AS bridges 15.

In this example, each of the CPUs #0 and #1 has the plural CPU cores. However, each of the CPUs may have one CPU core. Also, in this example, the plural CPUs constitute the SMP, but a single CPU may be used. The allocation of the respective logical partitions to the CPU may not be always conducted in core granularity, but a single core may be shared by the plural logical partitions at the time-sharing manner.

<Outline of the Invention>

Now, a description will be given of the outline of the AS bridge and the AS packet which are the main portion of the present invention below.

Figure 7:
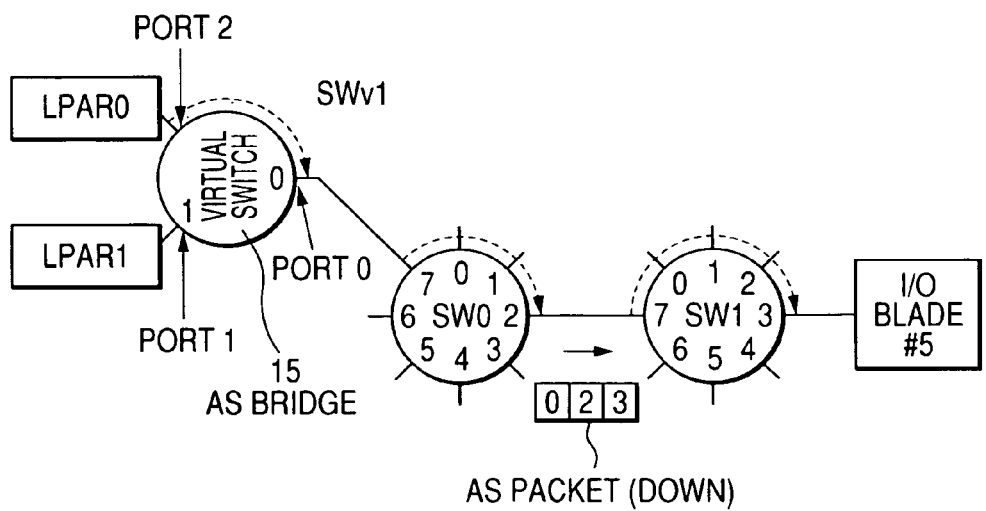
FIG. 7 is an explanatory diagram showing a virtual switch function of the AS bridge.

As shown in FIG. 7, the AS bridge 15 that is disposed in each of the CPU blades #0 to #2 functions as a virtual AS switch. Physically, as shown in FIGS. 1 and 4, the AS bridge 15 and the AS switch #0 are connected to each other by the AS, and the AS bridge 15 and the north bridge 12 are connected to each other by the PCIe.

Referring to FIG. 4, when the CPU blade #0 is viewed from the AS side (AS switches #0 to #2) on the basis of the turn pool values TP1 to TPn, the turn pool value merely indicates the port of one AS switch #0. As a result, the plural logical partitions on the CPU blade #0 cannot be identified from the AS switch #0. This is a problem with the conventional example, and when the I/O access is conducted from the plural logical partitions (OS) that operate on one CPU blade, the AS switch side cannot reply to the logical partition that conducts the I/O access.

Under the circumstances, as shown in FIG. 7, the AS bridge 15 functions as a virtual AS switch (hereinafter referred to simply as "virtual switch") SWv1, and a turn pool value TP0 (virtual path information) within the virtual switch SWv1 which is virtually connected in each of the logical partitions is added in addition to the turn pool values TP1 to TPn of the actual AS switches #0 to #2, as shown in FIGS. 5 and 6.

Referring to FIG. 7, since the down AS packet that is forwarded to the I/O blade #5 from the CPU blade #0 passes through one virtual switch SWv1 and two physical AS switches #0 and #1, the first, second, and third turn pool values TP0, TP1, and TP2 are set in the AS packet as shown in FIG. 5. The turn pool values of the same number as the number (n) of the AS switches are added by the AS bridge 15. In the example shown in FIG. 5, three turn pool values TP0 to TP2 are added.

The AS bridge 15 of the CPU blade #0 produces the ports of the virtual switch SWv1 according to the number of logical partitions that are generated by the hypervisor 200. In the example of FIG. 7, since two logical partitions #0 and #1 are generated, the ports 1 and 2 are produced by the AS bridge 15.

When the I/O access is made from the plural logical partitions that operate in the CPUs #0 and #1 (or the respective CPU cores), the AS bridge 15 sets the turn pool value TP0 on the virtual switch SWv1 which indicates the route to the AS switch from the accessing logical partition. For example, in the case of an access from the logical partition #0 shown in FIG. 7, TP0=0 is set, and in the case of an access from the logical partition #1, TP0=1 is set. The setting of the turn pool value is the same as that in FIG. 4 described above.

Then, the AS bridge 15 reads the I/O accessed destination, and sets the turn pool value TP1 to TPn which correspond to the path from the CPU blade #0 to the accessed I/O blade.

For example, FIGS. 4 to 7 show a case in which the logical partition #0 of the CPU blade #0 accesses to the I/O blade #5.

Referring to FIG. 7, the AS bridge 15 generates the virtual ports 0 to 2, connects the virtual ports to the port 7 of the AS switch #0, connects the virtual port 1 to the logical partition #1, and connects the virtual port 2 to the logical partition #0.

In the virtual switch SWv1 that is a first switch viewed from the logical partition, since the AS packet is transferred to the adjacent port 0 of the logical partition #0, "0" is set in the virtual switch turn pool value TP0 which is the first turn pool value. At the AS side, the AS packet is transferred to the I/O blade #5 via AS switch 0 and from the ports 3 of the AS switch #1.

For that reason, since the AS packet is transferred to the port 2 from the port 7 in the physical AS switch #0 that is a second switch, the AS bridge 15 sets "2" counted clockwise from 0, to the second turn pool value TP1.

Subsequently, since the AS packet is transferred from the port 7 to the port 3 in the physical AS switch #1 that is a third switch, the AS bridge 15 sets "3" counted clockwise from 0, to the third turn pool value TP2.

As described above, the AS bridge 15 sets the turn pool values TP0 to TP2 of the down AS packet to "0, 2, 3", as shown in FIG. 5. In addition, the direction bit DIR is set to 0 in order to express that the AS packet is the down packet.

As shown in FIGS. 1 and 5, the AS bridge 15 of the CPU blade #0 is connected to the port number 7 of the AS switch #0. The AS switch #0 that is the second switch viewed from the logical partition #0 reads the second turn pool value TP1, counts up to 2 of the turn pool value TP1 from 0 clockwise in FIGS. 4 and 7, sets the port of the port number 2 to the forwarding destination of the AS packet, and transfers the AS packet to the port number 2.

Since the port 2 of the AS switch #0 is connected to the port 7 of the AS switch #1, the AS packet is transferred to the AS switch #1.

Since the AS switch #1 is a third switch viewed from the logical partition #0, the AS switch #1 reads the third turn pool value TP2, counts up to 3 of the turn pool value TP2 from 0 clockwise in FIGS. 4 and 7, sets the port of the port number 3 to the forwarding destination of the AS packet, and transfers the AS packet to the port number 3. The port 3 of the AS switch #1 is connected with the I/O blade #5, and the AS packet is sent from the CPU #0 to the I/O blade #5. In this manner, the down AS packet is sequentially transferred to the port obtained when the respective AS switches sequentially read the turn pool values and counts clockwise.

Conversely, the AS packet that is forwarded from the I/O blade #5 to the CPU blades #0 reserves and sets the direction bit DIR (from 0 to 1) and also set the turn pool values TP0 to TPn of the down AS packet, as with the up AS packet shown in FIG. 6. The turn pool of the up packet whose direction bit DIR is 1 is interpreted from the right to the left, and the turn pool value is also counted counterclockwise by the respective AS switches.

That is, the turn pool values of the up AS packet in the case of FIGS. 4 and 7 are set in such a manner that the first turn pool value (rightmost in the case of the up packet whose direction bit DIR is 1) TP2 is set to "3", the second turn pool value TP1 is set to "2", and the virtual switch turn pool value TP0 is set to "0" as the third value, as shown in FIG. 6. The turn pool values TP0 to TPn same as the up AS packet are set by the LEAF bridges of the respective I/O blades.

Then, the AS switch #1 that is a first AS switch viewed from the I/O blade #5 reads the first turn pool value TP2=3, counts up to 3 of the turn pool value TP1 from 0 counterclockwise in FIGS. 4 and 7, sets the port of the port number 7 to the forwarding destination of the AS packet, and transfers the AS packet to the port number 7.

Since the port 7 of the AS switch #1 is connected to the port 2 of the AS switch #0, the AS packet is transferred to the AS switch #0.

Since the AS switch #0 is a second AS switch viewed from the I/O blade #5, the AS switch #0 reads the second turn pool value TP1, counts up to 2 of the turn pool value TP1 from 0 counterclockwise in FIG. 4, sets the port of the port number 7 to the forwarding destination of the AS packet, and transfers the AS packet to the port number 7.

As shown in FIG. 7, the port 7 of the AS switch #0 is connected to the virtual switch SWv1, and the virtual switch SWv1 is a third AS switch viewed from the I/O blade #5. Therefore, the virtual switch SWv1 reads the third turn pool value TP0, counts up to 0 of the turn pool value TP0 from 0 counterclockwise in FIG. 4, sets the port number 2 to a forwarding destination of the AS packet, and transfers the AS packet to the logical partition #0 that is virtually connected to the port 2.

In this manner, the down AS packet is sequentially transferred by the respective AS switches to the ports indicated by the turn pool values by counting counterclockwise, and the virtual switch turn pool value TP0 and the virtual switch SWv1 of the AS bridge 15 are finally used. As a result, it is possible that the I/O accessing logical partition #0 is identified from the AS switch side to surely return the AS packet.

The fabric managing server 4 that manages the AS switch also manages the virtual switch SWv1 that is provided by the AS bridges 15 of the respective CPU blades as the topology of the AS switch group in addition to the AS switches #0 to #2.

The above description is given of a case in which the designation is a single unicast packet. The following description will be given of a case of the multicast. In the multicast, each of the packets has an MGID (multicast group ID) that uniquely represents the destination of the multicast. Each of the switches has the predetermined multicast table 180, and outputs the packet to all of the output ports corresponding to the MGID at the same time.

In the present invention, the multicast table of the virtual switch SWv1 is newly located in the AS bridge 15 which is set in each of the CPU blades to support the multicast to the plural logical partitions on the same CPU blade. Upon receiving the multicast packet, each of the bridges reads the multicast table entry of the virtual switch corresponding to the MGID of the packet, and determines which logical partition needs to be multicast. Thereafter, each of the bridges writes data in a main memory space of the corresponding logical partitions, or distributes the event to the corresponding logical partitions.

The fabric managing server 4 that manages the AS switches also manages the multicast table of the virtual switch SWv1 that is provided by the AS bridge 15 in each of the CPU blades in addition to the AS switches #0 to #2 as the multicast table of the AS switch group.

<Details of AS Bridge>

Figure 3:
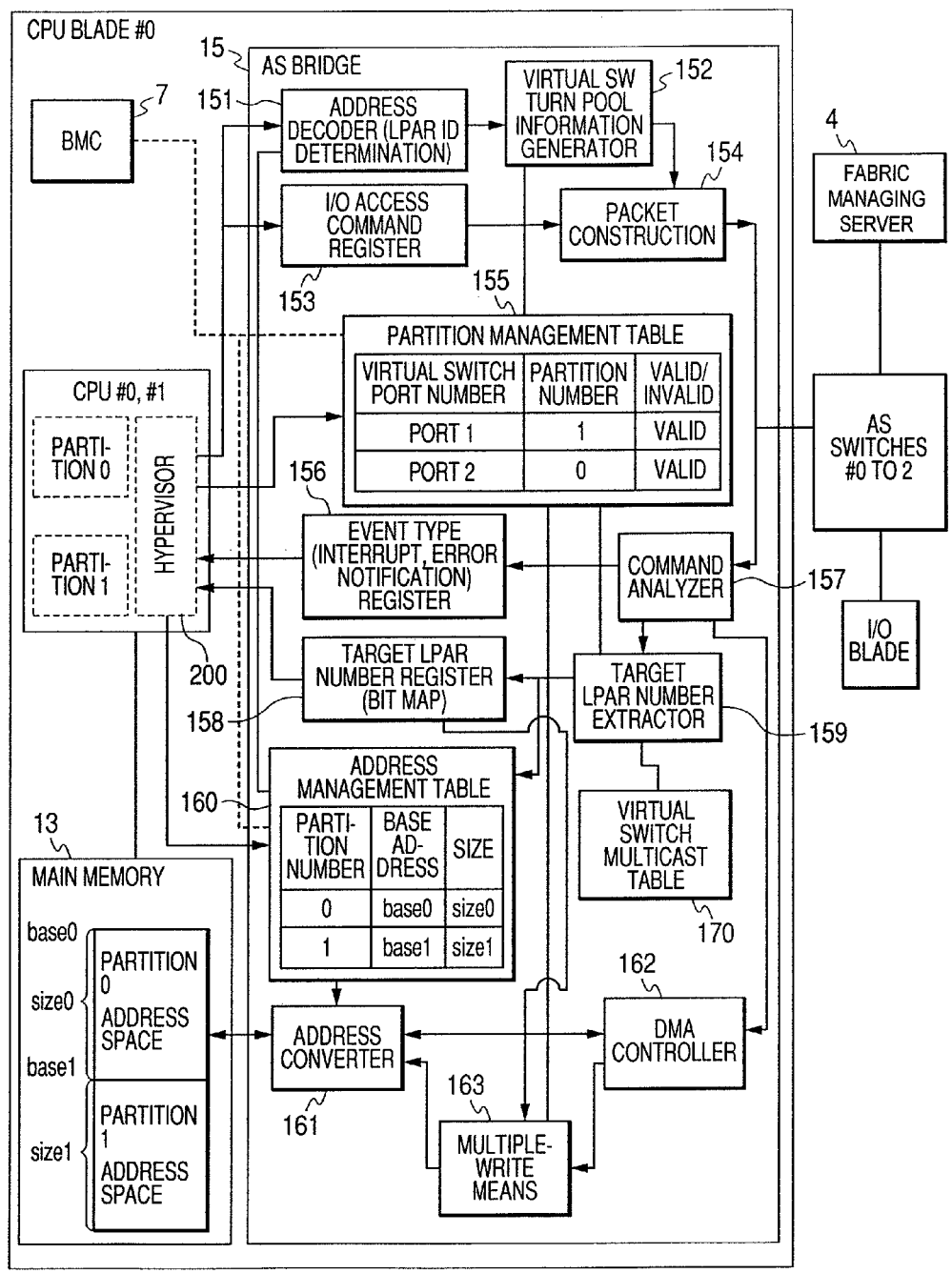
FIG. 3 is a functional block diagram mainly showing an AS bridge.

Subsequently, a description will be given in more detail of the AS bridge 15 that functions as the virtual switch with reference to FIG. 3. FIG. 3 is a functional block diagram mainly showing the AS bridge 15 of the CPU blade #0, and other CPU blades are identical in the structure with the CPU blade #0. Also, a communication between the AS bridge 15 and the CPUs #0, #1, or the main memory 13 is conducted through the north bridge 12 as shown in FIG. 1.

The AS bridge 15 includes the controller 16 and the memory 17 as shown in FIG. 1, and provides a virtual switch that functions as a virtual AS switch which presents the plural logical partitions as plural nodes viewed from the AS switches #0 to #2 side. For that reason, in the memory 17 of the AS bridge 15, the BMC 18 generates a partition management table 155 that sets a correspondence of the logical partitions that operate on the hyper visor 200 and the virtual port number of the virtual switch, an address management table 160 that manages an address on the main memory 13 of the respective logical partitions, an I/O access command register 153 that receives the I/O access command from the logical partitions, an event register 156 that receives the event (interrupt or error notification) from the I/O blade side, and a target LPAR number register 158 for determining the transferred logical partition in the case where the event is transferred from the I/O blade. The target LPAR number register 158 is made up of the bit map in order to support the multicast transfer of the event. In the case of the multicast, the plural bits become 1. Further, in the case of the multicast, a virtual switch multicast table 170 that is representative of a relationship between the MGID and the target logical partitions is produced by the fabric managing server (this process is conducted every time a new multicast group is defined). The virtual switch multicast table 170 is structured as shown in FIG. 19, and structured by a bit map corresponding to the respective logical partitions (output LPAR in the figure) in each of the multicast group IDs (MGID). The virtual switch multicast table 170 is set with the bits that indicate whether the multicast is transferred to the respective logical partitions, or not. The multicast transfer is permitted when the bit is 1, and the multicast transfer is inhibited when the bit is 0. Referring to FIG. 19, the multicast transfer to the logical partition #1 is permitted when MGID=1, and the multicast transfer to the logical partition #0 is inhibited.

In addition, in the case where the fabric managing server 4 communicates with the hypervisor that is located in each of the CPU blades by In-bound (through the AS fabric), the target LPAR number register 158 has bits corresponding to the hypervisor in addition to the bits corresponding to the respective logical partitions. In this example, in the case where the event is sent to the hypervisor, the bits corresponding to the hypervisor turn on.

The structural elements in the AS bridge 15, except for partition management table 155, the address management table 160, the virtual switch multicast table 170 and respective registers correspond to the controller 16 of FIG. 1.

First, as shown in FIG. 8, the partition management table 155 is made up of the virtual port number of the virtual switch that is allocated to a number of the logical partition, and the fields indicating whether the logical partition is active or inactive. The partition management table 155 is updated when the hypervisor 200 produces or deletes the logical partition.

Further, in the case of conducting the In-bound management, information on the virtual switch corresponding to the hypervisor is also indicated.

Figure 10:
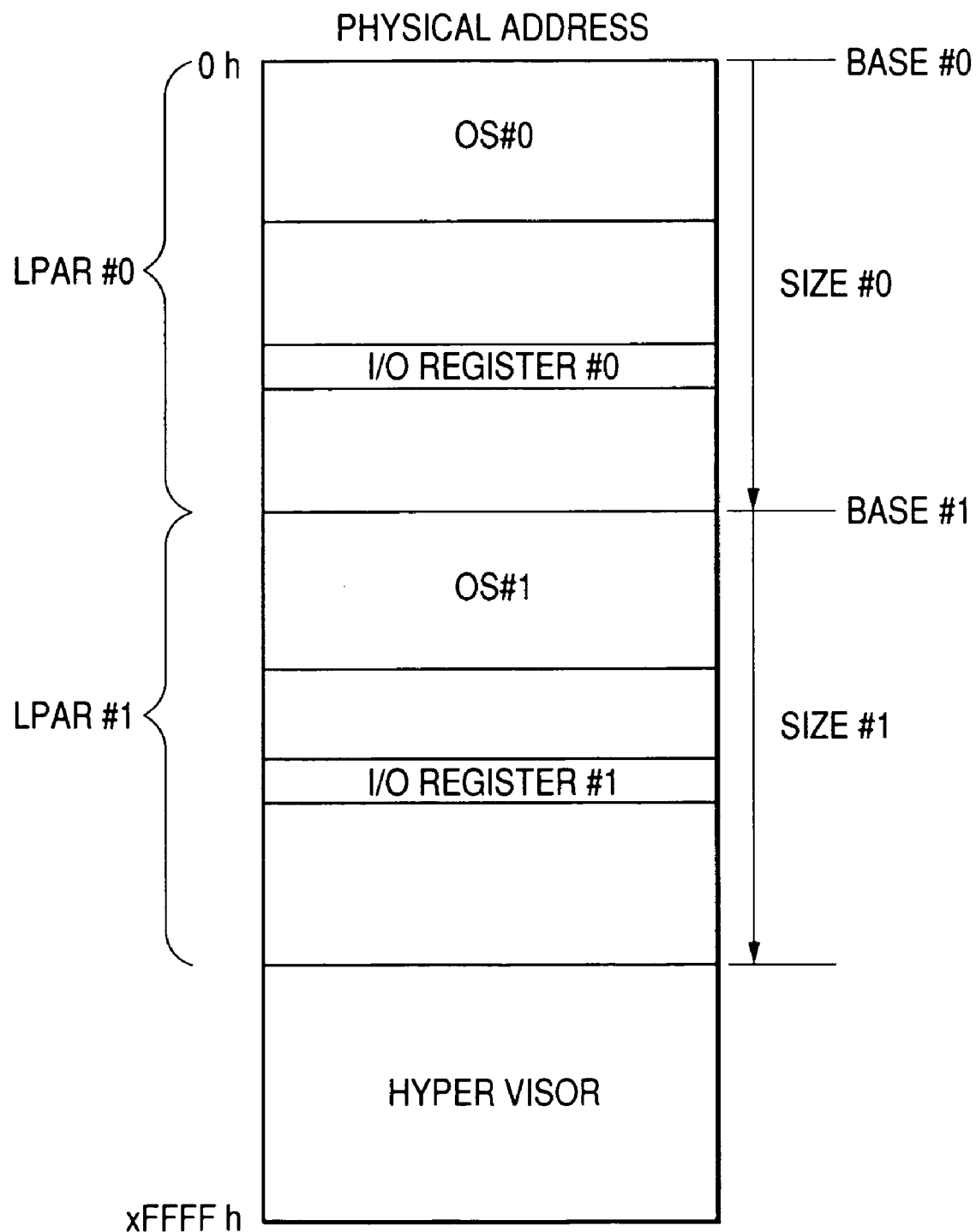
FIG. 10 is an address map showing the contents of a main memory of a CPU blade.

As shown in FIG. 9, the address management table 160 sets the base address of the logical partitions on the physical address space, and the size of the respective logical partitions in each of the logical partition numbers in order to indicate the positions of the respective partitions. The address management table 160 is updated by the hypervisor 200 when the hypervisor 200 produces or deletes the logical partition. The address space of the main memory 13 is structured, for example, as shown in FIG. 10, and the base addresses and the sizes of the respective logical partitions (LPAR) are managed by the hypervisor 200. The I/O register is mapped on the address map of the respective logical partitions by the hypervisor 200, respectively.

The I/O access command register 153 receives the I/O access commands from the OSs operates on the respective logical partition. The I/O access command includes, for example, a PIO request to the I/O register (read and write with respect to a control status register of I/O device), a DMA transfer (READ/WRITE) request, or information on the I/O blade which is a target.

Figure 11:
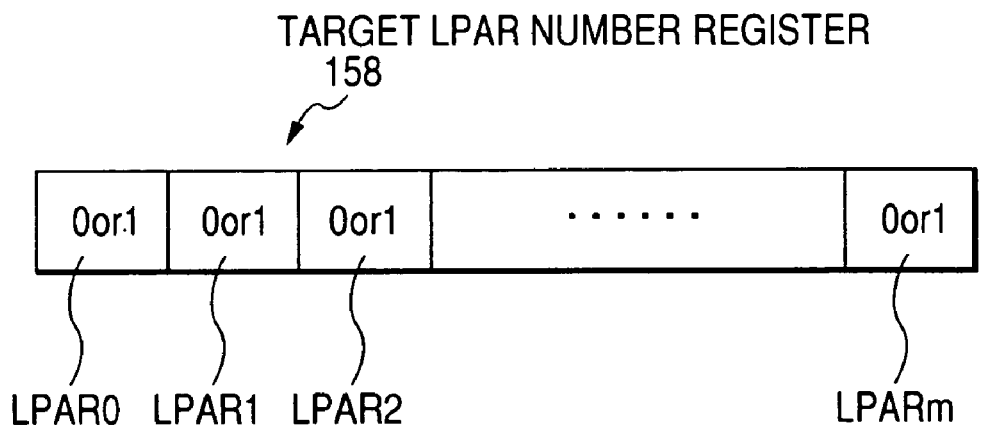
FIG. 11 is an explanatory diagram showing an example of a target LPAR No. register.

The event register 156 receives the interrupt from the I/O blade, generated by the completion of the disk access or by the notification (data/command) from the network such as Ethernet (registered trademark) interface, or the error notification. Then, they are transferred to the respective logical partitions via the hypervisor 200. The event may be the unicast or the multicast. In the case of the unicast, the number of target logical partition that has been obtained from the turn pool information of the virtual switch is set in the target LPAR number register 158. In the case of the multicast, the multicast table 170 of the virtual switch is obtained by the MGID of the packet, and the bit map of the target logical partitions (LPAR) is obtained and set in the target LPAR number register 158. The hypervisor 200 conducts transfer on the basis of the bit map in each of the logical partitions (LPAR) that are set in the target LPAR number register 158 shown in FIG. 11. The virtual switch multicast table 170 and the target LPAR number register 158 shown in FIG. 11 have bits in each of the logical partitions, conduct the multicast when the bit corresponding to each of the logical partitions is 1, and inhibit the multicast when the bit is 0. The multicast table 170 of the virtual switch is managed by the fabric managing server 4.

Now, a description will be given of the respective portions of the controller 16. First, when there is an I/O access from the logical partition, the packet of the PCIe is transmitted to the AS bridge 15. The AS bridge 15 stores the I/O access command and the address of the I/O device representative of the target I/O blade of from the packet of the received PCIe in the I/O access command register 153. Also, the AS bridge 15 extracts the I/O register address included in the packet of the PCIe and the address of the main memory that conducts the DMA and inputs the extracted addresses to the address decoder 151. As a result, it is possible to specify the logical partition that has issued the I/O access.

The address decoder 151 determines what logical partition the extracted address belongs to with reference to the address management table 160. In other words, the logical partition where the extracted address falls between the base address and the base address plus the size which are indicated form the address management table 160 is determined as the logical partition that conducts the I/O access, and the logical partition number is sent to a virtual switch turn pool information generator 152.

Also, in the case of conducting the In-bound management, the address management table 160 has information on the address range of the hypervisor, and adds the corresponding virtual switch turn pool information to the hypervisor.

The determination of the logical partition which is conducted by the address decoder 151 may be conducted by comparing the address of the I/O register or the DMA address with the address set in the address management table 160 with respect to predetermined high bits (for example higher 8 bits).

The virtual switch turn pool information generator 152 refers the partition management table 155 from the received logical partition number, determines the virtual port number of the virtual switch corresponding to the logical partition number, and sends the determined virtual port number to a packet construction portion 154 as the virtual switch turn pool value TP0 shown in FIG. 5.

The packet construction portion 154 reads the information on the I/O blade of the target from the I/O access command register 153, and determines the turn pool values TP1 to TPn shown in FIG. 5 as the path information. The path information between the AS bridge 15 and the I/O blade of the target is determined on the basis of the path information that has been acquired by the packet construction portion 154 from the fabric managing server 4 in advance. In other words, the AS bridge 15 determines the path information between the CPU blade and the I/O blade according to the path information that has been acquired from the fabric managing server 4 in advance, on the basis of an identifier of the accessed (target) I/O blade (device) included in the I/O access request that has been received from the I/O bus 14.

The packet construction portion 154 reads the virtual switch turn pool value TP0 into the turn pool values TP1 to TPn indicating the path from the AS bridge 15 to the target I/O blade, adds the virtual switch turn pool value TP0 to the head of the turn pool values TP1 to TPn as shown in FIG. 5, and generates the header portion of the AS packet.

Then, the packet construction portion 154 generates the AS packet from the received PCIe packet with AS header information constructed by the virtual switch turn pool value TP0, the turn pool values TP1 to TPn, and the DIR bit 0, and then transmits the AS packet to the AS switches #0 to #2.

The AS bridge 15 generates the down AS packet through the address decoder 151, the virtual switch turn pool information generator 152, the I/O access command register 153, the packet construction portion 154. The AS bridge 15 then sends the AS packet to the AS switch #0 that is connected to the AS bridge 15.

Next, a case in which the AS bridge 15 receives the AS packet from the AS switch #0 will be described.

Upon receiving the up AS packet from the AS switch #0, the AS bridge 15 receives the up AS packet by a command analyzer 157 to analyze the command which is contained in the PCIe packet within the AS packet. The command analyzer 157 determines what of the event processing such as the DMA transfer, the interrupt, or the error notification the type of command is. In addition, the command analyzer 157 determines whether the multicast is necessary, or not.

Then, when the command of the received AS packet is the DMA transfer or the multicast DMA, the command analyzer 157 transmits the PCIe packet that has been extracted from the AS packet to the DMA processor 162. In the case where the received AS packet is the event processing such as the interrupt or the error notification, or the multicast event, the command analyzer 157 transmits the PCIe packet that has been extracted from the AS packet to the event register 156.

A target LPAR number extractor 159 operates in the different manner between the unicast and the multicast.

In the case of the unicast, as shown in FIG. 6, the target LPAR number extractor 159 extracts the virtual switch turn pool value TP0 that has been stored in the final turn pool value from the header portion of the up AS packet. Then, the target LPAR number extractor 159 acquires the logical partition number corresponding to the virtual switch turn pool value TP0 from the partition management table 155, and identifies the target logical partition of the received AS packet. The target LPAR number extractor 159 sends a bit map representative of the number of the identified logical partition (only one bit is set in this case) to the address management table 160 and the target LPAR number register 158.

In the case of the multicast, the target LPAR number extractor 159 obtains the MGID from the header portion of the AS packet, read the multicast table 170 of the virtual switch, and sends a bit map that is representative of the number (plurality) of the target logical partition of the received packet to the address management table 160 and the target LPAR number register 158. In this example, because the multicast is conducted by only the upstream switch, and there may be only one target LPAR in the CPU, there is a case in which only one bit is set by the bit pattern of the multicast table of the virtual switch.

In the case where the command is the DMA transfer, the DMA processor 162 obtains the base address on the basis of the address management table 160 from the logical partition number that has been determined by the target LPAR number extractor 159. Then, the DMA processor 162 converts the address on the main memory 13 that is actually accessed from the DMA address within the PCIe packet by an address converter 161. Then, the AS bridge 15 implements the DMA transfer (read or write) with respect to the address on the main memory 13 which has been determined by the address converter 161.

In this situation, the address converter 161 determines whether the address on the main memory 13 which conducts the DMA transfer falls within the address range that is obtained from the base address and the size of the logical partition where transfer is conducted, or not. Then, when the determination result is that the address falls within the subject logical partition, the address converter 161 conducts the DMA transfer. When the address on the main memory 13 that conducts the DMA transfer exceeds the address area of target logical partition, the address converter 161 suspends the DMA transfer, and prevents the operation from being conducted in the different logical partition, to thereby ensure the reliability of the virtual computer.

In the case of conducting the In-bound management, the DMA that is outputted from the fabric managing server 4 to the hypervisor is not subjected to the address range check of the above logical partition.

Subsequently, in the case where the command of the AS packet is the multicast DMA, the PCIe packet is transferred to a multiple-write means 163 from the DMA controller 162. The multiple-write means 163 refers to the target LPAR number register 158 shown in FIG. 11. Then, the multiple-write means 163, read the LPAR number register 158 shown in FIG. 11 and determine which bit is one, inquires the address converter 161 about the address on the main memory 13 of the logical partition that is the target of the DMA transfer, and implements the multiple write with respect to the plural logical partitions. Likewise, in the case of the multicast, the address converter 161 determines whether the address of the logical partition to be written is fair, or not, as with the DMA transfer. Thus, the address converter 161 prevents the unfair write from being conducted.

Then, in the case where the command of the AS packet is the event processing (including the multicast) such as interrupt or error notification, the command analyzer 157 sends the PCIe packet that has been extracted from the up AS packet to the event register 156, and gives notification to the hypervisor 200 from the event register 156. The hypervisor refers to the target LPAR number register 158, and transfers the event to the logical partition whose bit map is 1.

As described above, upon receiving the I/O access request from the I/O bus 14, the AS bridge 15 generates the turn pool values TP1 to TPn on the basis of the identifier of the intended I/O blade, and the virtual switch turn pool value TP0 on the basis of the logical partition that has requested the I/O access. Then, the AS bridge 15 adds the virtual switch turn pool value TP0 and the turn pool values TP1 to TPn to the packet of the I/O access that has been received from the I/O bus 14 to generate the down AS packet, thereby functioning as the virtual switch of the down AS packet.

Upon receiving the up AS packet from the connected AS switch #0, the AS bridge 15 extracts the virtual switch turn pool value TP0 that is added to the end of the turn pool value. Then, the AS bridge 15 identifies the logical partition that is a destination of the up AS packet, and transmits the AS packet from which the header portion has been removed to the I/O bus 14, thereby function as the virtual switch of the up AS packet.

<Initialization and Update of AS Bridge>

Then, the AS bridge 15 initializes or updates the tables or the registers on the memory 17 through the BMC 7, the hypervisor 200, or the fabric managing server 4 when the CPU blades starts, the hypervisor 200 changes the partitions, or the I/O blade changes.

Figure 12:
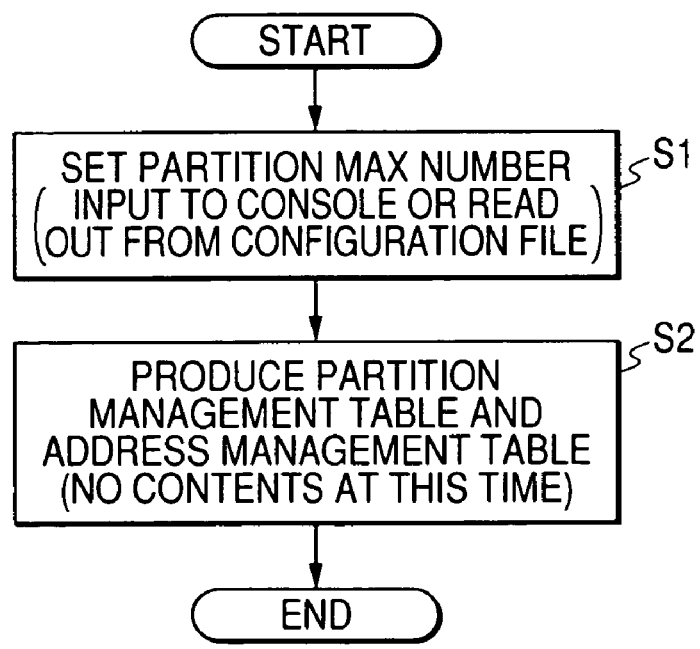
FIG. 12 is a flowchart showing an example of the BMC control at the time of initializing the CPU blade.

A description will be given of the initialization when the CPU blade in which the AS bridge 15 is disposed starts. FIG. 12 is a flowchart showing an initializing process which is conducted by the BMC 7 at the time of starting the CPU blade.

When the CPU blade starts, the BMC 7 sets the number of logical partitions that can be produced in the CPU blade (Step S1). The maximum number of logical partitions is set by the console 70 shown in FIG. 1. The maximum number of logical partitions which can be produced in the CPU blade can be set by reading a predetermined file by the BMC 7 other than inputting from the console 70.

Then, the BMC 7 accesses to the memory 17 of the AS bridge 15, and produces the partition management table 155 and the address management table 160 at given addresses in the memory 17 according to the maximum number of logical partitions that is set in Step S1 (Step S2).

At the time when the processing of the above steps S1 and S2 has been finished, only the respective tables of the AS bridge 15 are produced in the memory 17, and their contents are unset. That is, in the processing of FIG. 12, the sizes of the respective tables are allocated in the memory 17 of the AS bridge 15, according to the maximum number of logical partitions that can be set in the CPU blade.

Figure 13:
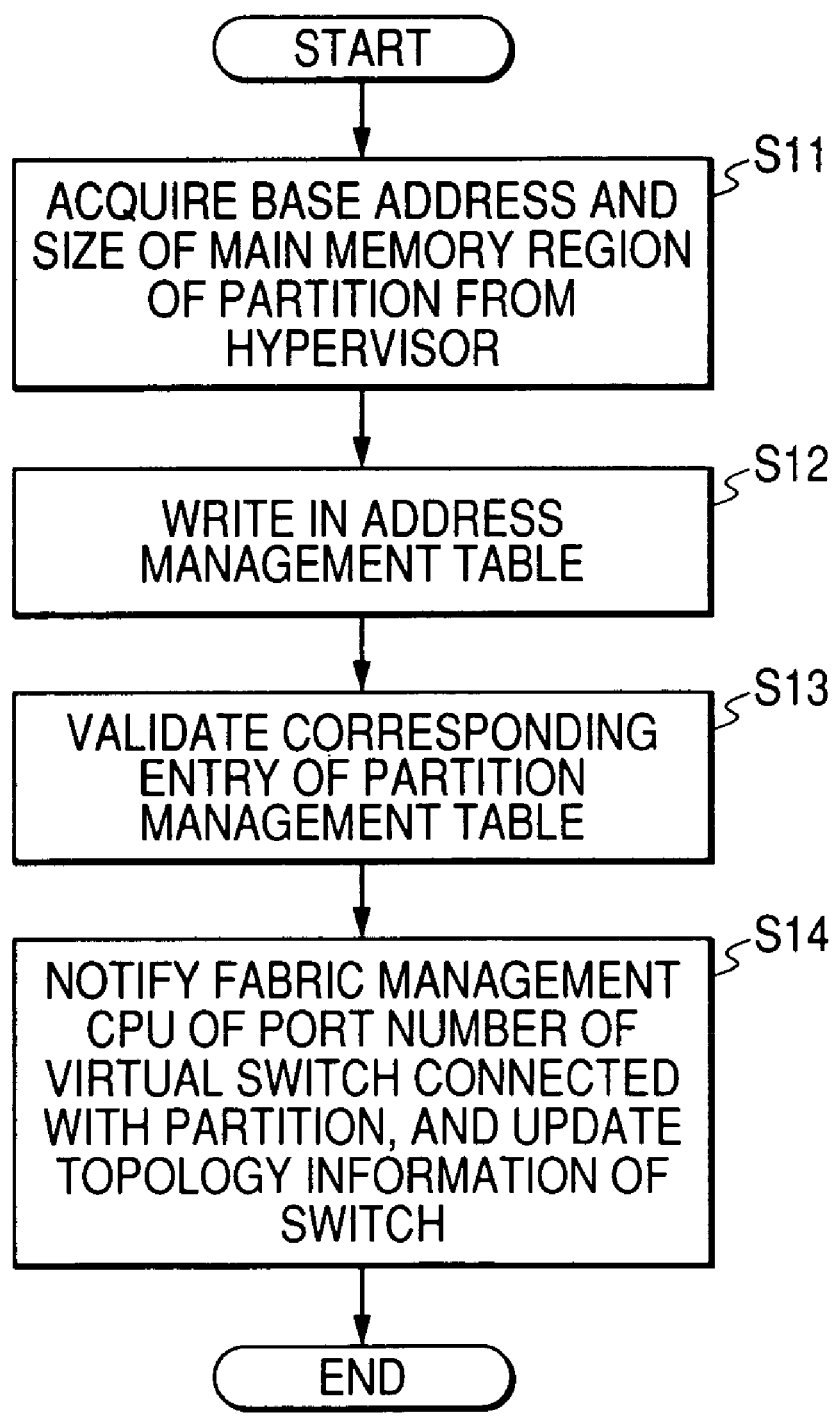
FIG. 13 is a flowchart showing an example of a hypervisor control at the time of producing or updating logical partitions.

Now, a description will be given of the processing of the AS bridge 15 when the hypervisor 200 produces or changes (including the deletion) the logical partition with reference to FIG. 13. FIG. 13 is a flowchart showing an example of the processing that is conducted when the hypervisor 200 initializes the logical partition.

First, in Step S11, the hypervisor 200 acquires the base address and the size of the logical partition which is produced (or changed) by the hypervisor 200 on the main memory 13 as well as the logical partition number.

Then, in Step S12, the hypervisor 200 writes the base address and the size in the address management table 160 shown in FIG. 9 with respect to the logical partition number where the logical partition is changed.

In Step S13, the hypervisor 200 retrieves the partition number of the partition management table 155 shown in FIG. 8 with respect to the logical partition number that has been written in the address management table 160. The hypervisor 200 then updates the column of validity or invalidity with respect to the entry (virtual switch port number) of the partition management table 155 corresponding to the subject logical partition number. That is, the hypervisor 200 sets the entry of the partition management table 155 to valid at the time of producing the logical partition. The hypervisor 200 also sets the entry of the partition management table 155 to invalid at the time of deleting the logical partition.

In the case where no logical partition number that has been written in the address management table 160 exists for the partition numbers of the partition management table 155 shown in FIG. 8, the hypervisor 200 writes the logical partition number in the entry of the virtual port number of the partition management table 155 where the partition number is empty and updates the column of the valid/invalid.

In Step S14, the hypervisor 200 notifies the fabric management server 4 of the virtual switch port number that has been written in the partition management table 155. The fabric management server 4 acquires information on the virtual switch SWv1 that is provided to the topology of the AS switch by the AS bridge 15, thereby making it possible to manage the logical partition on the virtual switch which has been produced or updated.

In addition, in the case where a new multicast group has been defined, or in the case where the existing multicast group has been deleted, the fabric management server 4 checks to which LPAR the subject multicast group needs to send the packet. Then, the fabric management server 4 writes 1 in a bit corresponding to the logical partition of the virtual switch multicast table 170 in the AS bridge 15, which needs to output the packet. The fabric management server 4 also writes 0 in a bit corresponding to the logical partition of the virtual switch multicast table 170, which does not need to output packet.

In the virtual switch, because a process of returning the multicast result to the input port (reflection) is not conducted as with the normal AS switch, no bit representative of an input of the bridge is provided in the virtual switch multicast table.

<AS Bridge Data Write and Event Notifying Process>

Figure 14:
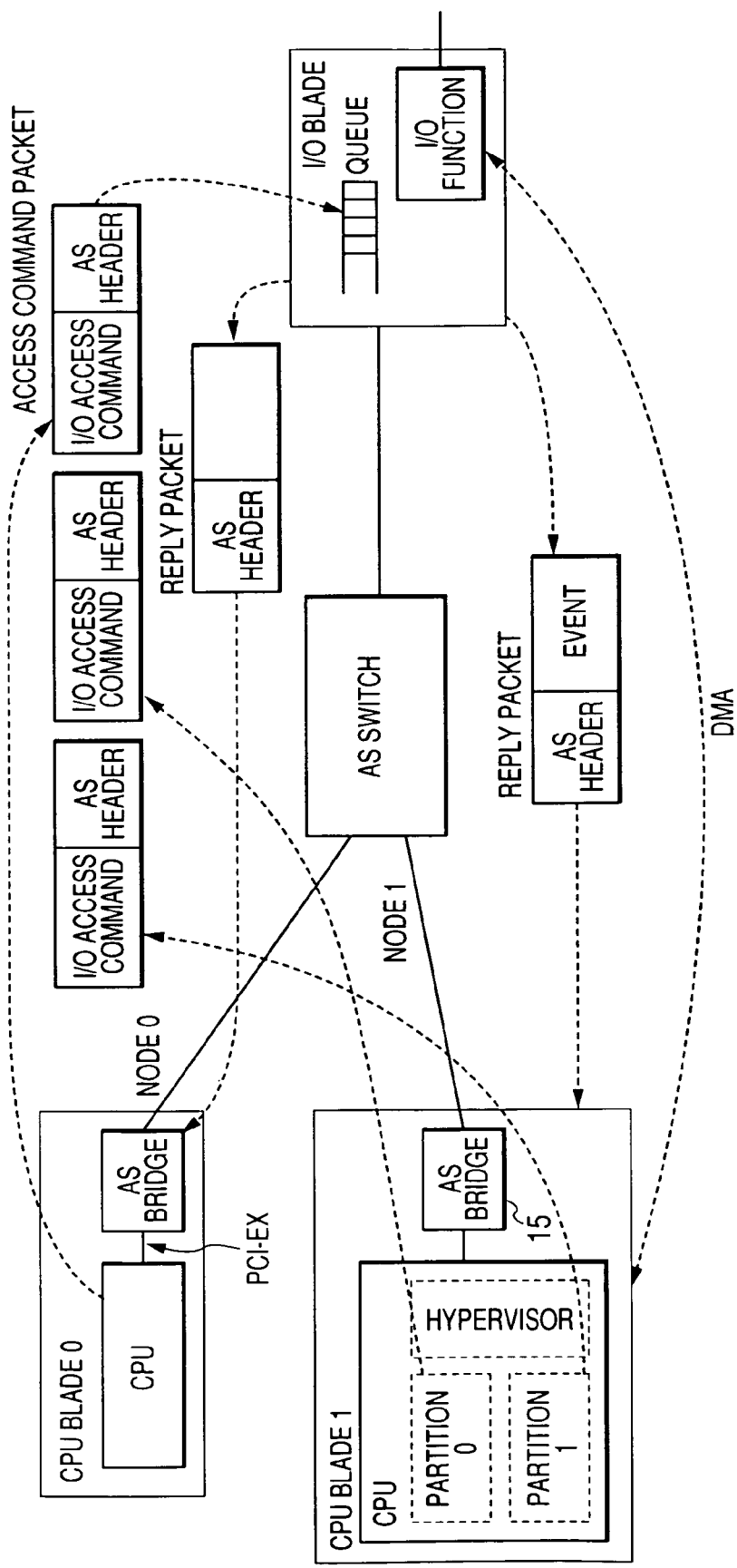
FIG. 14 is an explanatory diagram showing a state of a down AS packet and an up AS packet.

In a response to the I/O access that is required by the logical partition, as shown in FIG. 14, the up AS packet (reply packet) is sent to the CPU blade that has transmitted a request according to the function of the AS switch. Further, the up AS packet (reply packet) to the I/O access request is sent to the plural logical partitions within the CPU blade by means of the virtual switch that is provided by the AS bridge 15.

In this case, if the AS bridge 15 is viewed from the AS switch side, since the fabric managing server 4 identifies the AS bridge 15 as the virtual switch SWv1, the logical partitions (or physical partitions) of each of the CPU blades can be regarded as the downstream node of the virtual switch SWv1.

After the AS bridge 15 that has received the up AS packet has confirmed from the partition management table 155 that the target logical partition is valid, the AS bridge 15 conducts, according to the contents (commands) of the AS packet, reading and writing to the memory space of the respective logical partitions due to the DMA, or sending of the event to the respective logical partitions through the hypervisor 200, as shown in FIG. 3. When the corresponding logical partition of the partition management table 155 is invalid, the AS bridge 15 discards the AS packet.

The up packet includes a DMA request and an event processing request issued from the I/O. In the case of DMA issued from I/O, the main memory of the designated logical partition is accessed. In the case of event processing, the event such as interrupt is sent to the designated logical partition. On the contrary, in the case of the multicast (multicast DMA, multicast event), the same DMA or event can be sent to the plural logical partitions from the subject I/O blade. In other word, in the case of the multicast, the same DMA data is written in the plural logical partitions that are set in the virtual switch multicast table 17 in advance, or the same event is sent. As for writing due to the multicast, as shown in FIG. 3, in the case of the multicast DMA, the AS bridge 15 issues the multiple write with respect to the respective logical partitions on the main memory 13. In the case of the multicast event, the AS bridge 15 serves a notice to the hypervisor 200, and the hypervisor 200 notifies the plural target logical partitions of the event.

Figure 15:
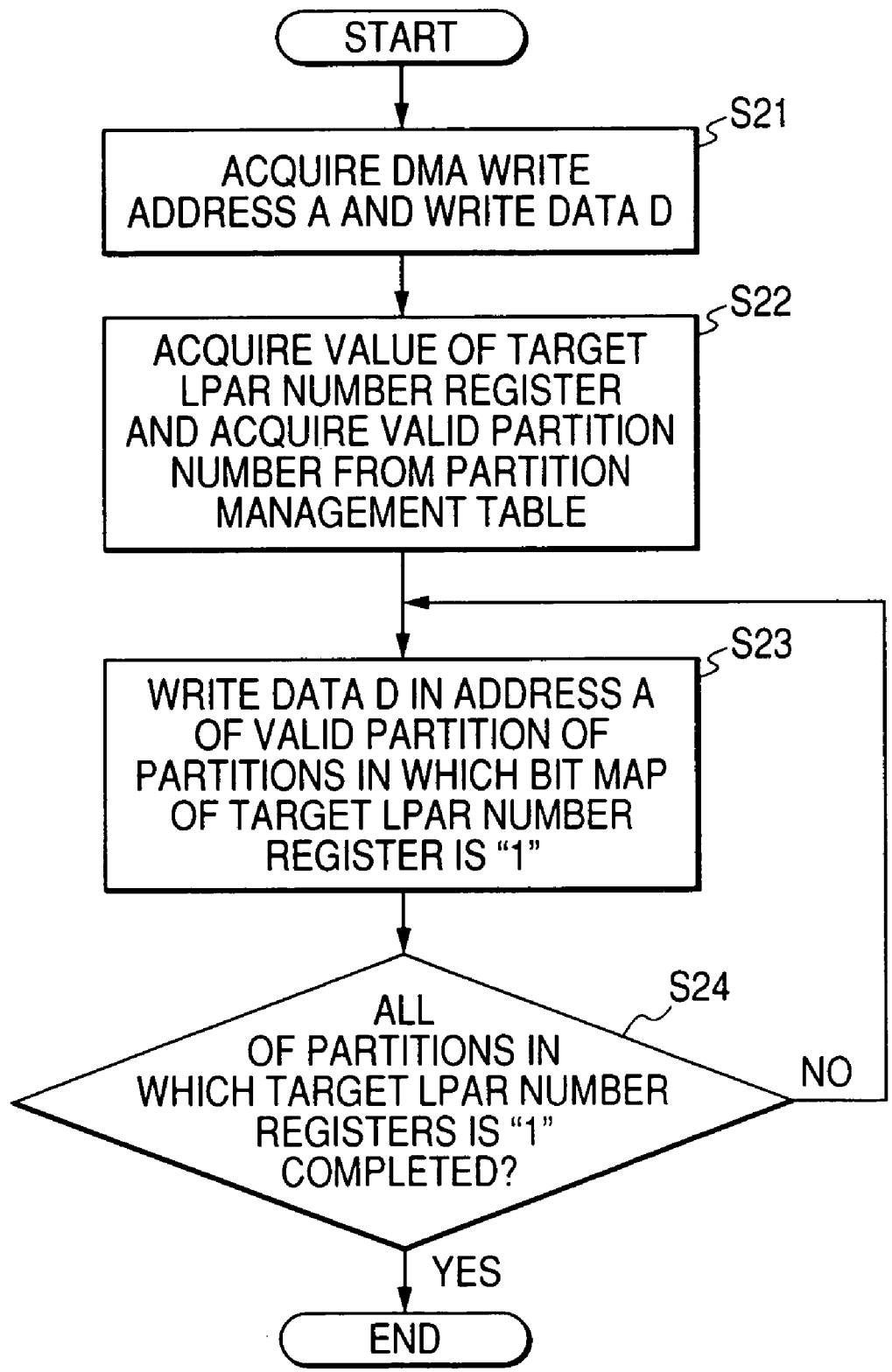
FIG. 15 is a flowchart showing an example of an AS bridge at the time of multicast.

FIG. 15 is a flowchart showing an example of processing that is executed by the AS bridge 15 when the up AS packet is the multicast DMA. This processing corresponds to the functions of the DMA controller 162 and the multiple write means 163 in FIG. 3.

First, in Step S21, a write address A and write data D of the DMA are extracted from the up AS packet. In Step S22, the bit map representative of the number of the logical partition (partition number) which is a destination of the DMA is acquired from the destination LPAR number register 158, and also the logical partition number that is valid is acquired among the logical partitions of the partition management table 155. Then, in Step S23, the AS bridge 15 acquires one number of the logical partition in which the bit map of the target LPAR number register 158 is 1 (and valid), and determines the logical partition that conducts the multicast DMA write. In the case of writing, the AS bridge 15 adds the base address of the respective logical partitions to the DMA address of the up AS packet, and confirms that the addition result does not exceed the region (a range of base address to base address+size) on the main memory 13 which is allocated to the respective logical partitions. Thereafter, the AS bridge 15 writes the data D in each address A of the logical partitions by means of the DMA.

In Step S24, the AS bridge 15 determines whether the write of the multicast has been completed with respect to all of the logical partitions in which the bit of the target LPAR number register 158 is 1. When the write of the multicast has been completed, processing is finished, whereas the write has not yet been finished, the control is returned to Step S23 in which the multicast DMA is written in the remaining logical partitions.

As described above, the AS bridge 15 is capable of determining the logical partition that is being now used among the logical partitions which are destinations of the multicast from the bit map of the target LPAR number register 158, and the column of the valid or invalid of each of the logical partitions which is set in the partition management table 155. Also, the AS bridge 15 is capable of determining the logical partition that is the target of the multicast DMA. As a result, the AS bridge 15 is capable of writing the same data D with respect to only the plural logical partitions that require the multicast DMA. Also, the AS bridge 15 checks the valid or invalid of the LPAR with the result that in the case where the LPAR repeats on/off operation, a overhead of changing the multicast table can be eliminated (in particular, it is effective in the broadcast-address case where all the bits are 1.

In the case where there are plural address ranges of the DMA, after data of some address has been written in all of intended logical partitions, data of a subsequent address is written in the logical partitions. As a result, it is unnecessary to store the entire packet once, the necessary memory of the buffer region can be reduced, and writing can start before arrival of the entire packet, thereby making it possible to provide high speed processing.

In the case of the up AS packet of the multicast event, the AS bridge 15 transmits the event to the hypervisor 200. The hypervisor 200 that has received the notification of the multicast event obtains the intended plural logical partitions from the target LPAR number register 158, and notifies the plural logical partitions of the event.

The above description is given of the DMA addressed and the procedure of event transmission to the respective logical partitions. In addition, the DMA and the event which are addressed to the hypervisor are also supported when the In-bound management is possible. In this case, the target LPAR number register 158, the partition management table 155, and the address management table 160 have the entry corresponding to the hypervisor, thereby making it possible that the virtual switch supports the port and the turn pool information corresponding to the hypervisor.

<I/O Configuration>

Subsequently, a description will be given of the I/O configuration that is conducted by the fabric managing server 4 with reference to FIG. 16.

Figure 16:
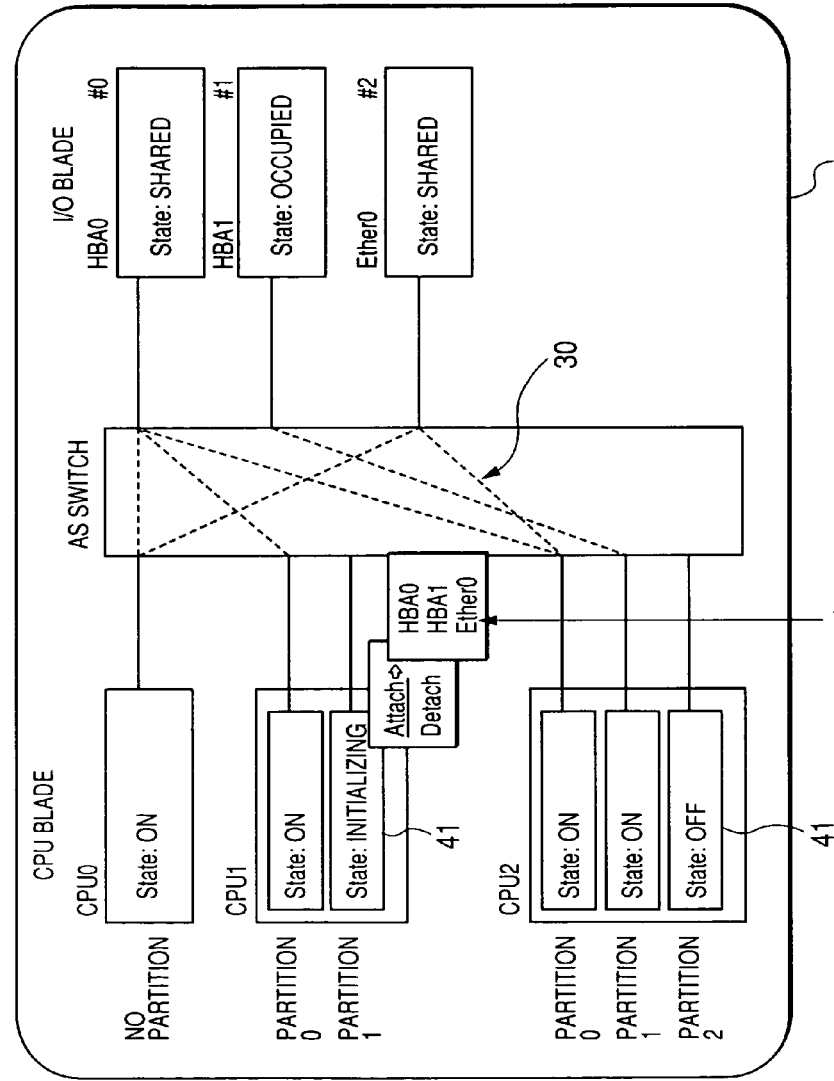
FIG. 16 is an explanatory diagram showing an example of a management screen of a fabric management server.

The console 5 that is connected to the fabric managing server 4 that manages the AS switch displays a blade server management screen as shown in FIG. 16. The fabric management server 4 manages a relationship between the I/O blade that is connected to the AS switch and the logical partition on the CPU blade. In other words, the fabric managing server 4 comprehends the state of the logical partition on the CPU blade so as to allocate I/O blades to the logical partition.

Referring to FIG. 16, there are shown the CPU blades #0 to #2, and plural boxes 41 are displayed according to the number of logical partitions which are set in the partition management table 155 shown in FIG. 8. A "state" column indicative of the state of the logical partition is displayed in each of the boxes 41. The "state" column indicates the logical partition that is valid in the partition management table 155 as "on", and indicates the logical partition that is invalid in the partition management table 155 as "off".

In FIG. 16, the CPU blade #0 indicates a state in which there is no logical partition and the physical partition is valid, and the CPU blade #1 indicates a state in which two logical partitions are generated, one logical partition is valid whereas the other logical partition is being initialized. The CPU blade #2 indicates a state in which three logical partitions are generated, and two logical partitions are valid whereas one partition is invalid.

Those CPU blades are connected to the AS switch that is connected with three I/O blades #0 to #2. Referring to FIG. 16, the I/O blade #0 is indicated on the console 5 with the name of "HBA0". Likewise, the I/O blade #1 is indicated with the name of "HBA1", and the I/O blade #3 is indicated with the name of "Ether 0".

Each of the I/O blades displays a "state" column indicative of the sharing state of the I/O, and the I/O blade that is connected to the plural logical partitions or physical partitions is indicated as "shared" whereas the I/O blade that is connected to the single logical partition or physical partition is indicated as "exclusive".

Then, on the blade server management screen, the AS switch is displayed by one box, dotted lines 30 indicative of the connection state of the I/O blades and the logical partitions (or the physical partitions) are displayed. Referring to FIG. 16, there is shown a state in which the I/O blade #0 (HBA0) is shared by the CPU blade #0 of only the physical partition and the logical partition 0 of the CPU blade #1 and so on.

In order to change the allocation of the I/O blade with respect to the logical partition (or physical partition), the box 41 of the logical partition or the physical partition is clicked with a cursor. With the click, a hierarchical menu 40 is displayed on the subject logical partition (or physical partition) of the console 5.

On the hierarchical menu 40 are displayed the type of the I/O blade operation (attach or detach), and the name of the I/O blade can be attached or detached. For example, as shown in the figure, in the case where a new I/O blade is attached to the logical partition 1 of the CPU blade #1 that is being now initialized, the names of the attachable I/O blades are displayed when "attach" is clicked. Therefore, when any one of those names is clicked, a new I/O blade is attached to the partition 1, and the dotted line 30 is indicated between the selected I/O blade and the logical partition 1. Conversely, in the case where the I/O blade is detached, the dotted line 30 is erased.

As described above, the fabric managing server 4 is capable of managing attachment of the I/O blade that is connected through the AS switch to the logical partition (or physical partition). The fabric managing server 4 is equipped with a CPU and a storage device which are not shown, and a table that manages the attachment of the I/O blade that is connected through the AS switch to the logical partition (or physical partition) is stored in the storage device. The table may have, for example, an attached CPU blade number and a field that stores the logical partition number therein.

Also, when the fabric managing server 4 changes the attachment of the I/O blade to the logical partition, the fabric managing server 4 notifies the hypervisor 200 of the details of change. In this situation, in the case where the fabric conducts the management through In-bound, the fabric managing server 4 may notify the hypervisor 200 of a change in the I/O configuration through the AS fabric. In the case of conducting the management in the out-of-bound manner, a change in the I/O configuration is transferred on a management network (not shown).

<Conclusion>

As described above, according to an embodiment of the present invention, when the I/O blade (device) is shared by the plural logical partitions by using the I/O switch such as the AS switch, the I/O bridge provided in the CPU blade is made to function as the virtual switch, and the virtual path information (virtual switch turn pool information) is set in each of the logical partitions, thereby making it possible to realize the sharing of the I/O using the I/O switch in the virtual computer system that provides the plural logical partitions within one CPU blade.

With the above structure, the present invention has the following advantages. That is, in the conventional art, in order to share the I/O between the virtual computers, software that identifies the logical partitions is required to make the overhead of the I/O access excessive. On the other hand, according to an embodiment of the present invention, the I/O is shared between the virtual computers (logical partitions) on the hardware level by using the PCI-EXPRESS that is a general-purpose I/O bus and the AS that switches over the PCI- EXPRESS. As a result, it is possible to require no software for identifying the logical partitions and to increase the I/O access speed.

Also, in the conventional art, because a specific I/O device inherent in the virtual computer system is required in order to share the I/O between the virtual computers, the system is expensive. On the contrary, according to an embodiment of the present invention, the I/O is shared between the virtual computers by using the PCI-EXPRESS that is the general-purpose I/O bus and the AS that switches over the PCI-EXPRESS, thereby making it possible to remarkably reduce the price of the system.

In particular, in realizing the server consolidation that consolidates the plural servers into one, because the I/O blade can be shared by the plural logical partitions, the I/O devices such as an NIC (network interface card) or an HBA ((fibre channel) Host Bus Adaptor) which have been conventionally provided for each of the CPU blades can be introduced as the I/O blades of the required number. As a result, the number of IO devices is remarkably reduced, thereby making it possible to reduce the introduction costs of the computer system. Also, since the CPU blade requires no I/O slot, the manufacture costs of the CPU blade can be reduced, thereby making it possible to effectively realize the server consolidation.

The above embodiment shows an example in which the plural AS switches are disposed in one switch blade 3. Alternatively, it is possible that one AS switch is disposed in one switch blade 3, and an AS switch group is structured by plural switch blades 3.

Also, the above embodiment shows an example in which the logical partition is retrieved by the higher-order bits of the address information of the logical partitions that are extracted by the address decoder 151. As another manner, a register that explicitly sets the ID of the logical partition can be set in the memory 17 of the AS bridge 15, or plural registers of this type can be disposed according to the number of logical partitions.

As was described above, according to an embodiment of the present invention, the I/O switch that switches over between the I/O device and the plural CPUs can be applied to the virtual computer system.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A computer system, comprising:
    a CPU (central processing unit) module including a plurality of CPU cores, an I/O (input/output) bridge that is connected to the CPU cores, and a main memory that can be accessed from the CPU cores and the I/O bridge; and
    an I/O switch that connects the I/O bridge of the CPU module to an I/O module,
    wherein the CPU module includes a firmware that divides the plurality of CPU cores and the main memory into a plurality of logical partitions,
    wherein the I/O bridge:
    constructs a down packet denoting an I/O access originated from one of said logical partitions, by adding first turn pool information which identifies a route from the I/O bridge to the I/O module, and second turn pool information, which is turn pool information of a virtual switch virtually formed in the I/O bridge, and which identifies the logical partition that originates said I/O access information obtained from the logical partition;
    extracts, from a response packet received via the I/O switch, third turn pool information which inherits the second turn pool information transferred to the I/O module, and identifies a destination of an entity of the response packet; and
    reads the extracted third turn pool information and forwards the entity of the response packet to a logical partition identified by the third turn pool information,
    stores a base address and a size of a region on the main memory to which the corresponding logical partition is allocated in association with each of the logical partitions;
    extracts a command that is included in the response packet received via the I/O switch;
    acquires, when the extracted command is a DMA (Direct Memory Access) command, the base address and the size corresponding to the respective logical partition, and adds the base address to a DMA address that is included in the DMA command; and
    conducts DMA access directly to the respective address of the main memory obtained as a result of adding the base address to the DMA address, the respective address being an address other than a result obtained by adding the base address to the DMA address that exceeds the respective region on the main memory which is respectively allocated to the corresponding logical partition indicated by size,
    wherein the I/O switch transfers the down packet and the response packet according to the route identified by the first turn pool information.

2. The computer system according to claim 1, wherein the DMA command is a multicast DMA command.

3. The computer system according to claim 1, wherein the virtual switch:
    stores, for each of the plurality of logical partitions, an identifier of a logical partition, and a base address and a size of a region on the main memory to which the logical partition is allocated;
    extracts a command that is included in the I/O access information received from the I/O module;
    acquires the base address and the size corresponding to the logical partition, and when the extracted command is a DMA command, adds the base address to the DMA address that is included in the DMA command; and
    conducts DMA access directly to the address of the main memory which is indicated by the addition result when the addition result does not exceed the region on the main memory which is allocated to the logical partition indicated by the size.

4. The computer system according to claim 1, wherein the virtual switch:
    extracts a command that is included in the I/O access information received from the I/O module; and
    notifies the firmware of an event with a logical partition corresponding to the virtual path information as an address when the extracted command is the event,
    wherein the firmware notifies the logical partition corresponding to the virtual path information of the notified event.

5. The computer system according to claim 1, wherein the virtual switch:

stores, for each of the plurality of logical partitions, an identifier of a logical partition, and a base address and a size of a region on the main memory to which the logical partition is allocated;

controls write due to a multicast in each of the plurality of logical partitions;

extracts a command that is included in the I/O access information received from the I/O module;

acquires the base address and the size corresponding to the logical partition, and when the extracted command is a multicast DMA command, adds the base address to the DMA address that is included in the multicast DMA command in each of the plurality of logical partitions;

conducts DMA access to the address of the main memory which corresponds to the logical partition indicated by the addition result, respectively, when the addition result does not exceed the region on the main memory which is allocated to the logical partition indicated by the size; and conducts write with respect to each of the plurality of logical partitions which are destinations of the multicast.

6. The computer system according to claim 1, wherein the virtual switch:

controls an event due to a multicast in each of the plurality of logical partitions;

extracts a command that is included in the I/O access information received from the I/O module; and sets a target logical partition number, and notifies the firmware of an event that is included in a multicast event when the extracted command is the multicast event, and wherein the firmware notifies the plurality of logical partitions, based on the target logical partition number set, of the notified event.

7. The computer system according to claim 1, wherein the CPU blade sets the maximum number of logical partitions which can be produced to the CPU blade at the time of initializing the CPU blade.

8. The computer system according to claim 1, wherein the virtual switch includes a plurality of virtual ports that are set in each of the plurality of logical partitions, and wherein the firmware allocates the virtual ports to the plurality of logical partitions at the time of producing the plurality of logical partitions.

9. The computer system according to claim 1, wherein the virtual switch comprises a plurality of virtual ports that are set in each of the plurality of logical partitions, wherein the virtual switch manages a correspondence between the plurality of logical partitions and the virtual ports and the states of the plurality of logical partitions, and wherein the firmware updates a state of each of the plurality of logical partitions at the time of producing or deleting a logical partition.

10. The computer system according to claim 1, wherein the I/O switch connects a plurality of CPU blades and a plurality of I/O modules, wherein the computer system includes a fabric managing device that manages the allocation state of the I/O module with respect to the plurality of logical partitions that are set in the CPU module, and wherein the fabric managing device allocates one of the I/O modules to the plurality of logical partitions or the plurality of CPU modules.

11. An I/O (input/output) bridge comprising:
a controller; and
a memory,
wherein the controller:
connects a plurality of logical partitions into which a plurality of CPU (central processing unit) cores and a main memory are divided by firmware to an I/O switch, and conducts an I/O access between an I/O module that is connected to the I/O switch and the plurality of logical partitions;

constructs a down packet denoting an I/O access originated from one of said logical partitions, by adding first turn pool information which identifies a route from the I/O bridge to the I/O module, and second turn pool information, which is turn pool information of a virtual switch virtually formed in the I/O bridge, and which identifies the logical partition that originates said I/O access information obtained from the logical partition;

extracts, from a response packet received via the I/O switch, third turn pool information which inherits the second turn pool information transferred to the I/O module, and identifies a destination of an entity of the response packet;

reads the extracted third turn pool information and forwards the entity of the response packet to a logical partition identified by the third turn pool information;

stores a base address and a size of a region on the main memory to which the corresponding logical partition is allocated in association with each of the logical partitions;

extracts a command that is included in the response packet received via the I/O switch;

acquires, when the extracted command is a DMA (Direct Memory Access) command, the base address and the size corresponding to the respective logical partition, and adds the base address to a DMA address that is included in the DMA command; and conducts DMA access directly to the respective address of the main memory obtained as a result of adding the base address to the DMA address, the respective address being an address other than a result obtained by adding the base address to the DMA address that exceeds the respective region on the main memory which is respectively allocated to the corresponding logical partition indicated by size, wherein the I/O switch transfers the down packet and the response packet according to the route identified by the first turn pool information.

12. The I/O bridge according to claim 11, wherein the DMA command is a multicast DMA command.

13. The I/O bridge according to claim 12, wherein the virtual switch stores, for each of the plurality of logical partitions, an identifier of a logical partition, and the base address and the size of a region on a main memory to which the logical partition is allocated, and wherein the virtual switch retrieves a given bit of the address information of the plurality logical partitions which is extracted from the I/O access information, and acquires the logical partition corresponding to the address information to identify the logical partition.

14. The I/O bridge according to claim 13, wherein the virtual switch comprises a plurality of virtual ports that are set in each of the plurality of logical partitions, wherein the virtual switch manages a correspondence between the plurality of logical partitions and the virtual ports, and states of the plurality of logical partitions, and wherein the virtual switch acquires the virtual port corresponding to the logical partition, and sets the path information to the virtual port that is connected with the I/O switch from the virtual port as the virtual path information.

15. The I/O bridge according to claim 11, wherein the virtual switch:
    extracts the virtual path information of the virtual switch from the path information which is included in the I/O access information received from the I/O module; and
    identifies a logical partition corresponding to the extracted virtual path information to transfer the I/O access information to the logical partition.

16. The I/O bridge according to claim 15, wherein the virtual switch:
    stores, for each of the plurality of logical partitions, an identifier of a logical partition, and a base address and a size of a region on the main memory to which the logical partition is allocated;
    extracts a command that is included in the I/O access information received from the I/O module;
    acquires the base address and the size corresponding to the logical partition, and when the extracted command is a DMA command, adds the base address to the DMA address that is included in the DMA command; and
    conducts DMA access directly to the address of the main memory which is indicated by the addition result when the addition result does not exceed the region on the main memory which is allocated to the logical partition indicated by the size.

17. The I/O bridge according to claim 15, wherein the virtual switch:
    extracts a command that is included in the I/O access information received from the I/O module; and
    notifies the firmware of an event with the logical partition corresponding to the virtual path information as an address when the extracted command is the event.

18. The I/O bridge according to claim 15, wherein the virtual switch:
    stores, for each of the plurality of logical partitions, an identifier of a logical partition, and a base address and a size of a region on the main memory to which the logical partition is allocated;
    controls write due to a multicast in each of the plurality of logical partitions;
    extracts a command that is included in the I/O access information received from the I/O module;
    acquires the base address and the size corresponding to the logical partition, and when the extracted command is a multicast DMA command, adds the base address to the DMA address that is included in the multicast DMA command in each of the plurality of logical partitions;
    conducts DMA access to the address of the main memory which corresponds to the logical partition indicated by the addition result, respectively, when the addition result does not exceed the region on the main memory which is allocated to the logical partition indicated by the size; and
    conducts write with respect to each of the plurality of logical partitions which are destinations of the multicast.

19. The I/O bridge according to claim 15, wherein the virtual switch:
    controls an event due to a multicast in each of the plurality of logical partitions;
    extracts a command that is included in the I/O access information received from the I/O module; and
    sets a target logical partition number, and notifies the firmware of an event that is included in a multicast event when the extracted command is the multicast event.

* * * * *